(12) United States Patent
Brady et al.

(10) Patent No.: US 10,233,021 B1
(45) Date of Patent: Mar. 19, 2019

(54) AUTONOMOUS VEHICLES FOR DELIVERY AND SAFETY

(71) Applicant: Amazon Technologies, Inc., Seattle, WA (US)

(72) Inventors: Tye Michael Brady, Southborough, MA (US); Darren Ernest Canavor, Redmond, WA (US); Ethan Zane Evans, Sumner, WA (US)

(73) Assignee: Amazon Technologies, Inc., Seattle, WA (US)

( * ) Notice: Subject to any disclaimer, the term of this patent is extended or adjusted under 35 U.S.C. 154(b) by 200 days.

(21) Appl. No.: 15/341,925

(22) Filed: Nov. 2, 2016

(51) Int. Cl.
| B65G 1/137 | (2006.01) |
| G01C 21/34 | (2006.01) |
| G05D 1/02 | (2006.01) |
| G01C 21/36 | (2006.01) |

(52) U.S. Cl.
CPC ....... *B65G 1/1373* (2013.01); *G01C 21/3407* (2013.01); *G01C 21/3697* (2013.01); *G05D 1/0214* (2013.01)

(58) Field of Classification Search
USPC ......................................................... 700/216
See application file for complete search history.

(56) References Cited

U.S. PATENT DOCUMENTS

| 4,865,248 A | 9/1989 | Barth |
| 4,954,962 A | 9/1990 | Evans et al. |
| 5,040,116 A | 8/1991 | Evans et al. |
| 5,386,462 A | 1/1995 | Schlamp |
| 5,995,898 A | 11/1999 | Tuttle |
| 6,344,796 B1 | 2/2002 | Ogilvie et al. |
| 6,426,699 B1 | 7/2002 | Porter |
| 6,690,997 B2 | 2/2004 | Rivalto |
| 6,694,217 B2 | 2/2004 | Bloom |
| 6,919,803 B2 | 7/2005 | Breed |
| 6,961,711 B1 | 11/2005 | Chee |
| 6,970,838 B1 | 11/2005 | Kamath et al. |
| 7,129,817 B2 | 10/2006 | Yamagishi |
| 7,133,743 B2 | 11/2006 | Tilles et al. |
| 7,188,513 B2 | 3/2007 | Wilson |
| 7,337,686 B2 | 3/2008 | Sagi-Dolev |

(Continued)

OTHER PUBLICATIONS

DHL Trend Research, "Self-Driving Vehicles in Logistics," Dec. 2014, Markus Kückelhaus et al. (downloaded from http://www.dhl.com/content/dam/downloads/g0/about_us/logistics_insights/dhl_self_driving_vehicles.pdf with an archived Web version available on https://web.archive.org/web/20151018154844/http://www.dhl.com/content/dam/downloads/g0/about_us/logistics_insights/dhl_self_driving_vehicles.pdf), 39 pages.

(Continued)

*Primary Examiner* — Kyle O Logan
(74) *Attorney, Agent, or Firm* — Athorus, PLLC

(57) ABSTRACT

The present disclosure is directed to autonomous vehicles, such as autonomous ground vehicles ("AGVs") that may be utilized to transport items to specified locations (e.g., residences, dormitory rooms, etc.), operate as a safety escort for a human moving from one location to another (e.g., from a campus library to a dormitory room), form ad-hoc wireless networks with other autonomous vehicles, and/or to operate as a mobile security station that can provide direct connection between a person at the location of the autonomous vehicle and security, rescue, and/or other personnel.

21 Claims, 12 Drawing Sheets

(56) References Cited

U.S. PATENT DOCUMENTS

| | | | |
|---|---|---|---|
| 7,337,944 B2 | 3/2008 | Devar | |
| 7,339,993 B1 | 3/2008 | Brooks et al. | |
| 7,946,530 B1 | 5/2011 | Talmage | |
| 8,511,606 B1 | 8/2013 | Lutke et al. | |
| 8,899,903 B1 | 12/2014 | Saad et al. | |
| 8,956,100 B2 | 2/2015 | Davi et al. | |
| 8,989,053 B1 | 3/2015 | Skaaksrud et al. | |
| 9,033,285 B2 | 5/2015 | Iden et al. | |
| 9,079,587 B1 | 7/2015 | Rupp et al. | |
| 9,139,310 B1 | 9/2015 | Wang | |
| 9,216,587 B2 | 12/2015 | Ando et al. | |
| 9,216,857 B1 | 12/2015 | Kalyan et al. | |
| 9,235,213 B2 | 1/2016 | Villamar | |
| 9,244,147 B1 | 1/2016 | Soundararajan et al. | |
| 9,256,852 B1 | 2/2016 | Myllymaki | |
| 9,336,506 B2 | 5/2016 | Shucker et al. | |
| 9,381,916 B1 | 7/2016 | Zhu et al. | |
| 9,545,852 B2 | 1/2017 | Streett | |
| 9,718,564 B1 | 8/2017 | Beckman et al. | |
| 9,974,612 B2 | 5/2018 | Pinter et al. | |
| 2001/0045449 A1 | 11/2001 | Shannon | |
| 2002/0016726 A1 | 2/2002 | Ross | |
| 2002/0087375 A1 | 7/2002 | Griffin et al. | |
| 2002/0111914 A1 | 8/2002 | Terada et al. | |
| 2002/0116289 A1 | 8/2002 | Yang | |
| 2002/0123930 A1 | 9/2002 | Boyd et al. | |
| 2003/0040980 A1 | 2/2003 | Nakajima et al. | |
| 2003/0141411 A1 | 7/2003 | Pandya et al. | |
| 2006/0136237 A1 | 6/2006 | Spiegel et al. | |
| 2007/0016496 A1 | 1/2007 | Bar et al. | |
| 2007/0073552 A1 | 3/2007 | Hileman | |
| 2007/0150375 A1 | 6/2007 | Yang | |
| 2007/0170237 A1 | 7/2007 | Neff | |
| 2007/0293978 A1 | 12/2007 | Wurman et al. | |
| 2008/0150679 A1 | 6/2008 | Bloomfield | |
| 2008/0154659 A1 | 6/2008 | Bettes et al. | |
| 2008/0167817 A1 | 7/2008 | Hessler et al. | |
| 2008/0301009 A1 | 12/2008 | Plaster et al. | |
| 2009/0062974 A1 | 3/2009 | Tamamoto et al. | |
| 2009/0063166 A1 | 3/2009 | Palmer | |
| 2009/0106124 A1 | 4/2009 | Yang | |
| 2009/0149985 A1 | 6/2009 | Chirnomas | |
| 2009/0236470 A1 | 9/2009 | Goossen et al. | |
| 2009/0299903 A1 | 12/2009 | Hung et al. | |
| 2009/0314883 A1 | 12/2009 | Arlton et al. | |
| 2010/0088163 A1* | 4/2010 | Davidson | G06Q 10/08 340/425.5 |
| 2011/0035149 A1 | 2/2011 | McAndrew et al. | |
| 2011/0264311 A1 | 10/2011 | Lee et al. | |
| 2012/0039694 A1 | 2/2012 | Suzanne | |
| 2012/0109419 A1 | 5/2012 | Mercado | |
| 2012/0219397 A1 | 8/2012 | Baker | |
| 2013/0073477 A1 | 3/2013 | Grinberg | |
| 2013/0081245 A1 | 4/2013 | Vavrina et al. | |
| 2013/0148123 A1 | 6/2013 | Hayashi | |
| 2013/0218799 A1 | 8/2013 | Lehmann et al. | |
| 2013/0261792 A1 | 10/2013 | Gupta et al. | |
| 2013/0262251 A1 | 10/2013 | Wan et al. | |
| 2013/0262252 A1 | 10/2013 | Lakshman et al. | |
| 2013/0262276 A1 | 10/2013 | Wan et al. | |
| 2013/0262336 A1 | 10/2013 | Wan et al. | |
| 2013/0264381 A1 | 10/2013 | Kim et al. | |
| 2014/0022055 A1 | 1/2014 | Levien et al. | |
| 2014/0030444 A1 | 1/2014 | Swaminathan et al. | |
| 2014/0032034 A1 | 1/2014 | Raptopoulos et al. | |
| 2014/0052661 A1 | 2/2014 | Shakes et al. | |
| 2014/0136282 A1 | 5/2014 | Fedele | |
| 2014/0136414 A1 | 5/2014 | Abhyanker | |
| 2014/0254896 A1 | 9/2014 | Zhou et al. | |
| 2014/0309813 A1* | 10/2014 | Ricci | B60Q 1/00 701/2 |
| 2015/0006005 A1 | 1/2015 | Yu et al. | |
| 2015/0069968 A1 | 3/2015 | Pounds | |
| 2015/0102154 A1 | 4/2015 | Duncan et al. | |
| 2015/0120602 A1 | 4/2015 | Huffman et al. | |
| 2015/0129716 A1 | 5/2015 | Yoffe | |
| 2015/0153175 A1 | 6/2015 | Skaaksrud | |
| 2015/0158599 A1 | 6/2015 | Sisko | |
| 2015/0175276 A1 | 6/2015 | Koster | |
| 2015/0183528 A1 | 7/2015 | Walsh et al. | |
| 2015/0185034 A1 | 7/2015 | Abhyanker | |
| 2015/0202770 A1 | 7/2015 | Patron et al. | |
| 2015/0227882 A1 | 8/2015 | Bhatt | |
| 2015/0246727 A1 | 9/2015 | Masticola et al. | |
| 2015/0259078 A1 | 9/2015 | Filipovic et al. | |
| 2015/0317597 A1 | 11/2015 | Shucker et al. | |
| 2015/0332206 A1 | 11/2015 | Trew et al. | |
| 2015/0367850 A1 | 12/2015 | Clarke et al. | |
| 2015/0370251 A1 | 12/2015 | Siegel et al. | |
| 2016/0009413 A1 | 1/2016 | Lee et al. | |
| 2016/0033966 A1 | 2/2016 | Farris et al. | |
| 2016/0104099 A1 | 4/2016 | Villamar | |
| 2016/0114488 A1 | 4/2016 | Medina et al. | |
| 2016/0144734 A1 | 5/2016 | Wang et al. | |
| 2016/0144982 A1 | 5/2016 | Sugumaran | |
| 2016/0200438 A1 | 7/2016 | Bokeno et al. | |
| 2016/0207627 A1 | 7/2016 | Hoareau et al. | |
| 2016/0257401 A1 | 9/2016 | Buchmueller et al. | |
| 2016/0266578 A1 | 9/2016 | Douglas et al. | |
| 2016/0299233 A1 | 10/2016 | Levien et al. | |
| 2016/0334229 A1 | 11/2016 | Ross et al. | |
| 2016/0364679 A1* | 12/2016 | Cao | G06Q 10/083 |
| 2016/0364989 A1 | 12/2016 | Speasl et al. | |
| 2017/0032315 A1 | 2/2017 | Gupta et al. | |
| 2017/0096222 A1 | 4/2017 | Spinelli et al. | |
| 2017/0098378 A1 | 4/2017 | Soundararajan et al. | |
| 2017/0101017 A1 | 4/2017 | Streett | |
| 2017/0164319 A1 | 6/2017 | Skaaksrud et al. | |
| 2017/0167881 A1 | 6/2017 | Rander et al. | |

OTHER PUBLICATIONS

DHL Trend Research, "Unmanned Aerial Vehicles in Logistics: A DHL perspective on implications and use cases for the logistics industry," 2014, Markus Kückelhaus et al., URL: http://www.dhl.com/content/dam/downloads/g0/about_us/logistics_insights/dhl_trend_report_uav.pdf with a Web Archive version available at: https://web.archive.org/web/20150923080141/http://www.dhl.com/en/about_us/logistics_insights/dhl_trend_research/uav.html, 24 pages.

Marcus Wohlsen, "The Next Big Thing You Missed: Amazon's Delivery Drones Could Work—They Just Need Trucks," Wired: Business, Jun. 10, 2014, URL: https://www.wired.com/2014/06/the-next-big-thing-you-missed-delivery-drones-launched-from-trucks-are-the-future-of-shipping/, 4 pages.

http://qz.com/613277/google-wants-to-deliver-packages-from-self-driving-trucks/.

http://www.geekwire.com/2016/google-pondering-drone-delivery-even-about-boxes-it-flies-to-front-doors/.

https://www.starship.xyz/.

* cited by examiner

AUTONOMOUS VEHICLES FOR DELIVERY AND SAFETY

BACKGROUND

Many companies, including "big box" retail and mail-order companies, package items (e.g., books, CDs, apparel, food, etc.) and/or groups of items together to be shipped in fulfillment of requests from customers (e.g., internal or external, retail or wholesale customers). Retailers, wholesalers, and other product distributors (which may collectively be referred to as distributors) typically maintain an inventory of various items that may be ordered by customers. This inventory may be maintained and processed at a materials handling facility. Such materials handling facilities may include, but are not limited to, one or more of: warehouses, distribution centers, cross-docking facilities, order fulfillment facilities, packaging facilities, shipping facilities, or other facilities or combinations of facilities for performing one or more functions of material (inventory) handling.

Ordered items are typically packed in shipping packages (e.g., corrugated boxes) and shipped to the customer's residence or place of business. The delivery of physical items to a customer's specified location is traditionally accomplished using a delivery system including a human controlled truck, bicycle, cart, etc. For example, a customer may order an item for delivery to their home. The item may be picked by a human agent from a materials handling facility, packed and shipped to the customer for final delivery by a shipping carrier, such as the United States Postal Service, FedEx, or UPS. An agent of the shipping carrier will load the item onto a truck that is driven to the final delivery location and a driver, or another human companion with the driver, will retrieve the item from the truck and complete the delivery to the destination. Over time, an increasing frequency and volume of deliveries of items from e-commerce and mail-order companies has resulted in an increased need for faster and more efficient delivery methods.

DETAILED DESCRIPTION

Figure 1A:
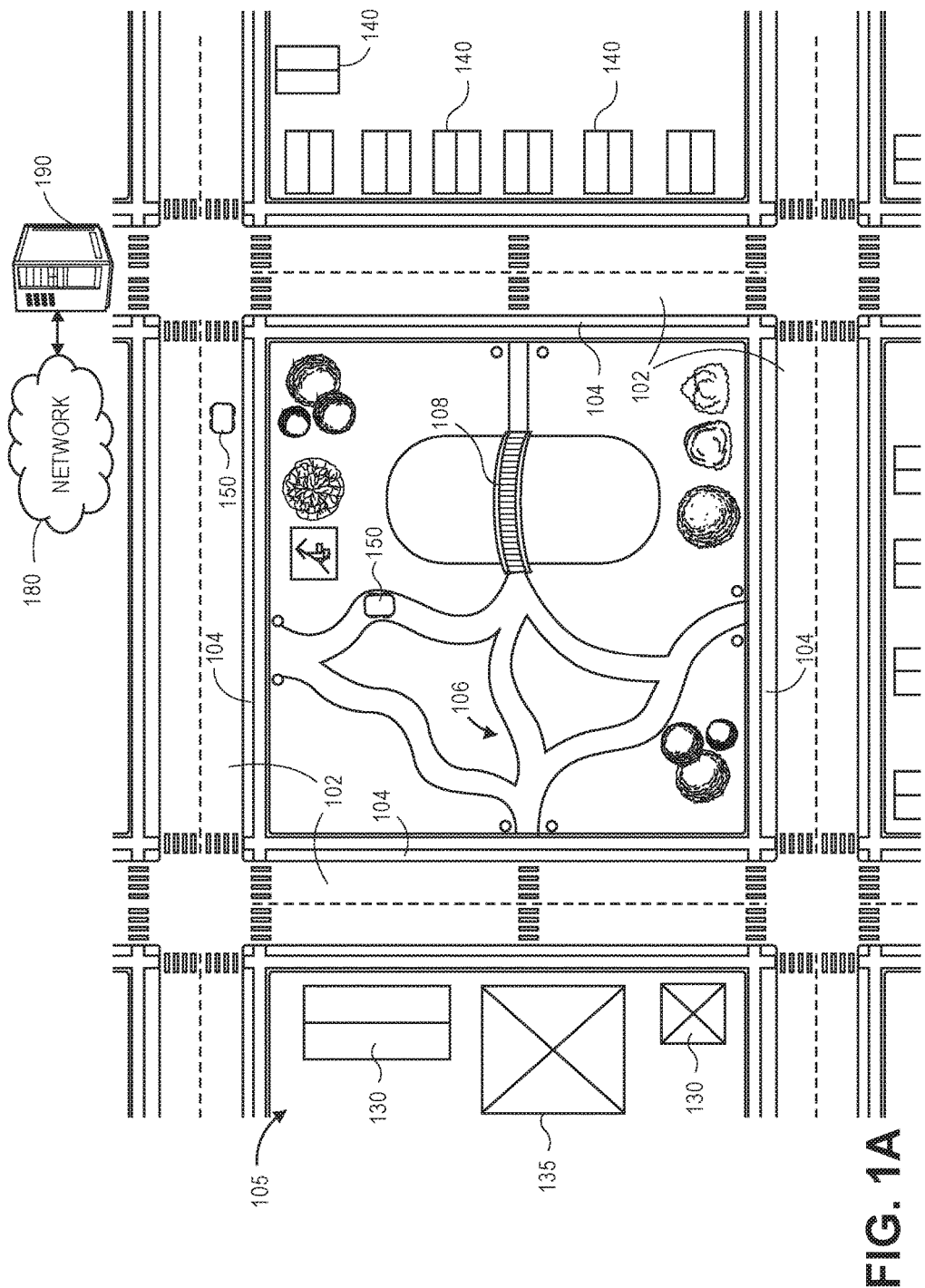
FIGS. 1A through 1C are views of aspects of one system, in accordance with implementations of the present disclosure.

As is set forth in greater detail below, the present disclosure is directed to autonomous vehicles, such as autonomous ground vehicles ("AGVs") that may be utilized to transport items to specified locations (e.g., residences, dormitory rooms, etc.), operate as a safety escort for a human moving from one location to another (e.g., from a campus library to a dormitory room), form ad-hoc wireless networks with other autonomous vehicles, and/or to operate as a mobile security station that can provide direct connection between a person at the location of the autonomous vehicle and security, rescue, and/or other personnel.

In one implementation, a subscriber may submit a request, referred to herein as an escort request, to have an autonomous vehicle meet them at a defined location, referred to herein as a source location, and escort the subscriber to a destination location. Upon receipt of the escort request, one or more autonomous vehicles are dispatched to the source location to meet the subscriber and escort the subscriber to a destination location. As the subscriber is moving between the source location and the destination location, the autonomous vehicle may activate one or more sensors that collect information regarding the area around the subscriber, thereby increasing the safety of the subscriber as the subscriber moves between locations. For example, the autonomous vehicle may activate one or more cameras included on the autonomous vehicle to record video of the area around the subscriber, thereby deterring potential criminal or other malicious activity. In some implementations, the video data may be streamed or otherwise transmitted to another location, such as a security control center nearby, thereby enabling security personnel to monitor the video.

In another example, one or more autonomous vehicles may include a security component that may be activated to establish a connection with emergency personnel (e.g., police, security, etc.). In such an implementation, upon activation, the autonomous vehicle may transmit location information, such as current global positioning system (GPS) information corresponding to the position of the autonomous vehicle, video data of the area in which the autonomous vehicle is operating, and/or audio data of the area in which the autonomous vehicle is operating. Likewise, the autonomous vehicle may activate a communication channel, such as a cellular communication channel enabling a person to communicate directly with the emergency personnel.

In still other examples, as an autonomous vehicle is navigating a route, also referred to herein as a navigation path, or path, (e.g., to deliver an ordered item), the autonomous vehicle may determine or detect a person nearby the planned route of the autonomous vehicle. In such an example, the autonomous vehicle may alter the planned route to pass by the person. As the autonomous vehicle passes the person, the autonomous vehicle may communicate with the person, provide aide to the person, if needed, record video and/or audio of the area of the person to improve the safety of the person, etc.

In still other examples, if an autonomous vehicle encounters a person as it is navigating a route, the autonomous vehicle may determine if the person potentially needs assistance, regardless of whether that person is a subscriber or a non-subscriber. If it is determined that assistance is needed, the autonomous vehicle may provide the assistance, if possible, establish a communication channel so that the human can communicate with another person or machine to receive assistance, alert emergency personnel that the person needs assistance, etc.

As discussed further below, autonomous vehicles may be outfitted with any number of sensors, including but not limited to GPS, receivers, speedometers, inclinometers, compasses, altimeters, gyroscopes, scanners, audio outputs (e.g., speakers, sirens), visual outputs (e.g., displays, projectors, lights), tactile outputs (e.g., braille display), audio inputs (e.g., microphones), visual inputs (e.g., digital video cameras, digital still cameras, thermal imaging cameras, infrared), distance detection sensors (e.g., light detection and ranging (LIDAR), sound navigation and ranging (SONAR), radio detection and ranging (RADAR)), tactile inputs (e.g., touch-based displays, mechanical keys/buttons), artificial olfaction device (also known as an electronic nose or e-nose) to detect smells and/or chemicals. Likewise, in some implementations, an autonomous vehicle may include and/or carry one or more other autonomous vehicles that may be deployed to provide additional security and/or safety. For example, an AGV may include an aerial vehicle that it may deploy and the aerial vehicle may include a camera that obtains images of the area from an aerial or overhead perspective.

An autonomous vehicle, traveling on a route as it delivers an item, provides a requested escort between locations, provides security for an area, etc., may be configured to capture information or data regarding conditions within the area using one or more of such sensors, and to utilize such information or data to continuously evaluate the area and determine if one or more security measures need to be performed (e.g., record and/or transmit video to a security location, activate a siren).

Alternatively, the autonomous vehicle may transmit such information or data to a monitoring system that is in communication with one or more of a fleet of autonomous vehicles. The monitoring system may process the data and determine if one or more security measures are to be performed by the autonomous vehicle, if other autonomous vehicles are to be routed to the area, if security personnel are to be notified, etc. The monitoring system may be in a physical location within an environment in which the automated vehicle(s) are operating, or in one or more alternate or virtual locations, e.g., in a "cloud"-based environment.

In addition to collecting data regarding an environment and providing safety/security, the autonomous vehicle may also provide advertisements, information, and/or function as a wireless access point for other devices (e.g., smartphones, laptops, tablets, etc.). In still other examples, persons may interact with an autonomous vehicle through verbal commands and/or by interacting with a touch-based display located on the autonomous vehicle. For example, the touch-based display may provide advertising or other information and a user may interact with the vehicle through the touch-based display. Likewise, if the autonomous vehicle is carrying an item that is available for immediate purchase, the item may be advertised on the display of the autonomous vehicle and a person may interact with the autonomous vehicle to purchase and gain immediate access to the item.

FIG. 1A illustrates an example environment in which one or more autonomous vehicles may operate, in accordance with implementations of the present disclosure. The environment 105 may include, for example, one or more source locations 130 and destination locations 140. A source location and/or destination location may include, for example, libraries, classrooms, grocery stores, shopping centers, night clubs, personal residences, apartment buildings, dormitories, etc. In some implementations, the environment 105 may also include one or more fulfillment centers 135 in which inventory may be stored and shipped from when an item is ordered by a customer. Likewise, a source location in one instance may be a destination location in another instance. In still other examples, a source location and/or a destination location may be any other geographic position or area, and does not necessarily have to correspond to a physical structure. For example, a source location may correspond to the current position of a subscriber and a destination location may correspond to any other location.

Likewise, the environment 105 includes a number of natural and artificial features over which one or more of autonomous vehicles may travel, including but not limited to a plurality of streets 102, a plurality of sidewalks 104 alongside the streets 102, a plurality of pathways 106 (e.g., bicycle or walking paths or trails) passing through a park, and a bridge 108 over a body of water in the park. The natural and artificial features define a number of paths between potential source locations and destination locations that may be navigated by the autonomous vehicles. Each of the paths may have a number of different attributes, and each of such attributes may be considered in determining a capacity for accommodating one or more of the autonomous vehicles 150 operating within the environment.

Attributes of the various paths of the environment 105 may be maintained in a monitoring system 190 that is connected to a communications network 180, and communicates with the fulfillment center 135 and/or one or more of the autonomous vehicles 150. Upon receiving an order from a customer, attributes of the various paths extending between the fulfillment center 135, a source location, and a delivery destination, referred to herein as a destination location 140, may be provided to computer devices associated with the fulfillment center 135 and/or one or more of the autonomous vehicles 150 operating within the environment over the communications network 180. Similarly, upon receiving an escort request from a subscriber, attributes of the various paths extending between a current location of an autonomous vehicle, a source location of the subscriber, and/or between the source location of the subscriber and a destination location may be provided to one or more of the autonomous vehicles 150 operating within the environment over the communications network 180. The attributes may specify the physical attributes of the natural and/or artificial surface of the paths, historical information along the path (e.g., past criminal activity or incidences), lighting or other illumination along the path, access to public areas along the path, and/or other information.

Based on the attributes, optimal routes for navigation by the autonomous vehicle to deliver an item and/or escort a human may be determined by the monitoring system 190 and provided to one or more of the computer devices associated with the fulfillment center 135 and/or one or more of the autonomous vehicles 150. Alternatively, an autonomous vehicle 150 may determine an optimal route based on the attributes, the current location of the autonomous vehicle, the location of the subscriber, the source location, the location of the fulfillment center, the destination location, the location of other subscribers, etc.

Figure 1B:
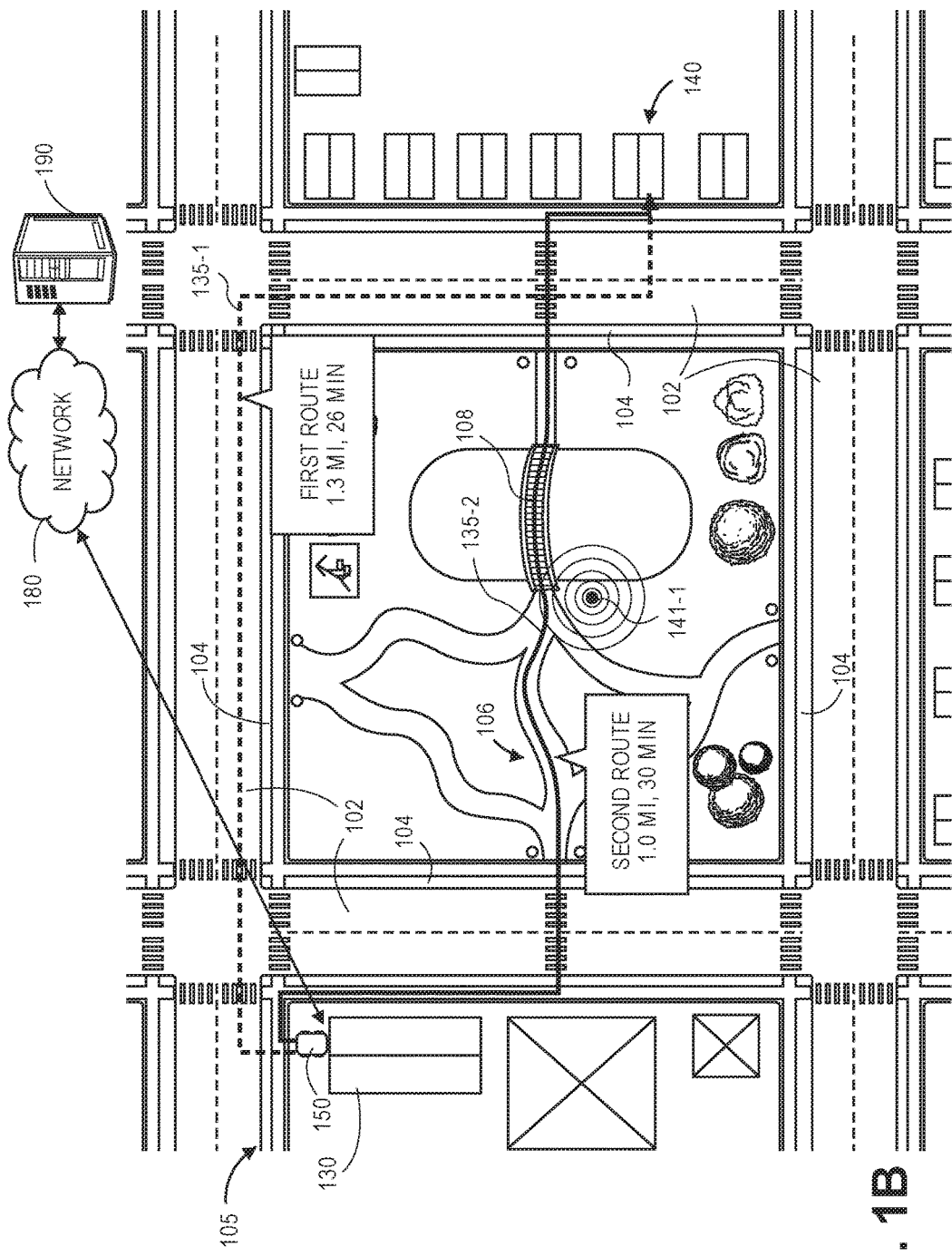

Referring to FIG. 1B, a first route 135-1 for an autonomous vehicle 150 that is to deliver an ordered item to a destination location is shown as beginning at the source location 130 and traveling along the streets 102 before turning toward the destination location 140. The first route 135-1 is estimated at one and three-tenths miles (1.3 mi) in length, and it is estimated that the autonomous vehicle 150 may travel from the source location 130 to the destination location 140 with the ordered item in approximately twenty-six minutes (26 min.). While the first route may be determined to be the fastest route to deliver the item, the system may determine a second route 135-2 from the source location 130 to the destination location 140 will cause the autonomous vehicle to pass within a defined distance of a subscriber 141-1, thereby potentially improving the safety of the area surrounding the subscriber 141-1 and/or confirming that the subscriber 141-1 is safe. The second route 135-2 includes the autonomous vehicle crossing one of the streets 102 and passing along the sidewalks 104 and pathways 106, past the subscriber 141-1 and across the bridge 108, before crossing another of the streets 102 and reaching the destination location 140. The second route 135-2 is estimated at one mile (1.0 mi) in length, and it is projected that the autonomous vehicle may travel from the source location 130 to the destination location 140 and past the subscriber 141-1 with an ordered item in approximately thirty minutes (30 min), assuming the autonomous vehicle does not stop at the location of the subscriber 141-1 to provide assistance or otherwise. In such an example, it may be determined that the autonomous vehicle should navigate the second route 135-2, even though taking a longer duration to deliver the item so that the security, safety and/or health of the subscriber 141-1 is potentially improved because of the autonomous vehicle navigating within a defined distance of the subscriber 141-1.

Upon selection of a route, such as the second route 135-2, an autonomous vehicle capable of navigating the route is selected to deliver the order. The autonomous vehicle may be programmed with one or more sets of computer instructions for causing the autonomous vehicle to embark upon the second route 135-2 from the source location 130 by traveling along and across one of the streets 102, entering the park on one or more of the pathways 106, navigating past or to the subscriber 141-1 and performing one or more safety check-ins (discussed below) with respect to the subscriber 141-1, before continuing along the route. In some implementations, the subscriber may be detected based on a location or position of a device (e.g., cellular phone, tablet, reading device, etc.) in the possession of the subscriber that periodically provides position information to the system 190 and/or the autonomous vehicle 150. A safety check-in may include, for example, interacting with the subscriber 141-1, obtaining images and/or video of the subscriber, detecting and measuring one or more characteristics of the subscriber (e.g., body temperature, position—standing, sitting, lying down—heart rate, responsiveness, etc.) Interaction with the subscriber may include outputting audio to illicit a response from the subscriber, such as an audible response.

The sensor data collected from the safety check-in of the subscriber 141-1 may be processed by the autonomous vehicle and/or sent by the autonomous vehicle to the monitoring system 190 and processed to determine if one or more security measures are to be taken with respect to the subscriber 141-1. For example, if the body temperature of the subscriber is below a defined threshold (e.g., ninety-seven and one-half degrees Fahrenheit), the subscriber is non-responsive to an interaction, the subscriber is determined to not be moving, etc., it may be determined that one or more security measures are to be performed. The security action may include, but is not limited to, the autonomous vehicle providing data to the monitoring system 190 indicating a position of the subscriber 141-1, the measured information regarding the subscriber (e.g., body temperature, heart rate, etc.), notifying emergency personnel, outputting an audible sound and/or visual output to attract attention, notifying another person that is associated with the subscriber 141-1, etc.

In comparison, if it is determined that one or more security measures are not to be performed, the autonomous vehicle may continue navigating the route, crossing the body of water on the bridge 108, exiting the park and crossing another of the streets 102 before reaching the destination location 140. Such instructions may be furnished to the autonomous vehicle 150 by one or more computer devices associated with the fulfillment center 135, or by the monitoring system 190, or may be autonomously generated by one or more computer devices associated with the autonomous vehicle itself.

While the autonomous vehicle is navigating the route 135-2, the autonomous vehicle may continually and/or periodically evaluate its surroundings using one or more sensors and/or other components of the autonomous vehicle, e.g., by capturing imaging data or other information regarding weather, traffic, accessibility, lighting, recording images of the area, or any other relevant factors. The autonomous vehicle 150 may be configured to report information or data regarding its navigation along the route 135-2 to the monitoring system 190, to one or more computer devices associated with the fulfillment center 135, or to one or more other autonomous vehicles over the network 180. Such information or data may be reported synchronously or asynchronously, on a continuous or segmented basis, e.g., in real time, in near-real time, or in one or more batch processes, or in any other manner. Upon reaching the delivery location 140, the autonomous vehicle 150 may deposit the ordered item in a predetermined location or otherwise enable the customer to access the ordered item.

After completing a delivery of the ordered item to the delivery location 140, the autonomous vehicle may return to the fulfillment center 135 along any desired route, or by way of any number of intervening waypoints, may remain at the delivery location until receiving further instructions, or may navigate within the environment 105 collecting data and/or providing a mobile security station for persons within the area. For example, the autonomous vehicle 150 may determine the location of other subscribers within the area, determine a route within the area that passes within a defined distance of at least some of those subscribers, and navigate along that route to provide security to the area near those subscribers as well as other areas navigated by the autonomous vehicle. The autonomous vehicle 150 may report information or data regarding the area to the monitoring system 190, to one or more computer devices associated with the fulfillment center 135, or to one or more other autonomous vehicles within the environment 105 over the network 180, or may upload any relevant information or data to one or more servers or other computer devices.

Figure 1C:
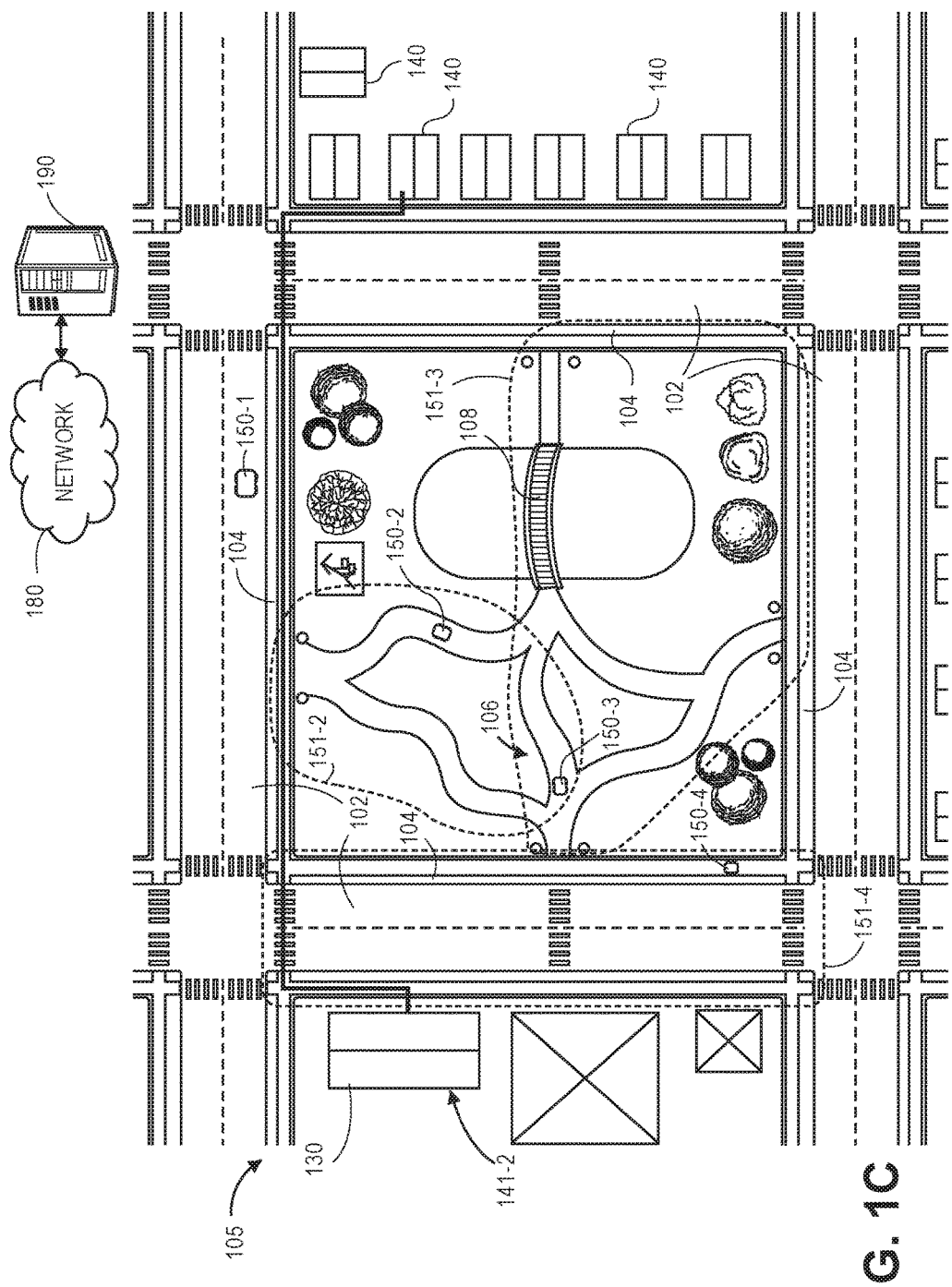

FIG. 1C illustrates the environment 105 that includes a plurality of autonomous vehicles 150 that may be utilized to deliver items and/or provide safety, in accordance with implementations of the present disclosure. In this example, the environment is a college campus. The first autonomous vehicle 150-1 is navigating between a fulfillment center and a destination location to deliver an item ordered by a customer. In comparison, autonomous vehicles 150-2, 150-3, and 150-4 are operating as mobile security stations, each navigating within a defined geographic area. For example, autonomous vehicle 150-2 is operating to provide a mobile security station within the geographic area 151-2, autonomous vehicle 150-3 is operating to provide a mobile security station within the geographic area 151-3, and autonomous vehicle 150-4 is operating to provide a mobile security station within the geographic area 151-4. The geographic areas may include specific navigation paths, geographic coordinates (e.g., geofencing) within which the autonomous vehicles are to remain, etc. As the autonomous vehicles 150 navigate to provide mobile security stations, the sensors and/or other components of the autonomous vehicles collect information that is processed to determine potential threats, hazards, security concerns, suspicious activity, etc. As data is collected, the data is processed by the autonomous vehicle and/or transmitted to the monitoring system 190 and processed. As the data is processed, a determination is made as to whether one or more security measures are to be performed. A security measure, discussed further below, may include, for example, illuminating an area under observation, recording video of an area, emitting a sound (e.g., siren or audible warning), notifying emergency personnel, etc.

In other implementations, the autonomous vehicles may not actively monitor the environment but instead only process data for specific actions or sounds (e.g., person running, a scream, etc.). If a specific action or sound is detected, the sensors and/or other components of the autonomous vehicle may then be activated to collect additional data that is processed to determine whether one or more security measures are to be performed.

In still another implementation, the autonomous vehicle may include an interface that may be activated by a person to establish a direct communication with another person (e.g., emergency personnel). In such an example, the person that activated the communication channel may ask for assistance, obtain directions, etc.

Returning to FIG. 1C, a subscriber 141-2 may submit an escort request to have an autonomous vehicle accompany the subscriber as the subscriber walks from a source location 130 (e.g., library) to a destination location 140 (e.g., dormitory room). The escort request may be scheduled in advance by the subscriber 141-2 to occur at a specific time and/or scheduled at the subscriber's convenience. For example, the subscriber 141-2 may utilize a software based application operating on a device (e.g., cellular phone) to submit the escort request. Such an application may, for example, allow the subscriber to submit preferences as to the size and/or type of autonomous vehicle to be used for the escort, specify the source location, the destination location, a navigation route to be followed, a time at which to meet the subscriber, and/or other information. In some instances, the subscriber may utilize the software application to view a map that includes an indication of the current position of each autonomous vehicle and an estimated time until an autonomous vehicle reaches the source location to provide the requested escort.

Upon receiving the escort request, the monitoring system 190 determines the position and current task of each autonomous vehicle 150-1, 150-2, and 150-3. Based on the positions and tasks, an autonomous vehicle is selected and instructed to navigate to the source location 130 (library) and operate as an escort for the subscriber. The instructions may include a destination location and/or a path to be followed to escort the subscriber to the destination location 140. Alternatively, the autonomous vehicle may operate in a follow mode in which it follows the subscriber until the subscriber reaches the destination or otherwise terminates the escort. In some implementations, the autonomous vehicle 150, even if operating in follow mode, may suggest a safest route for the subscriber and/or indicate areas of potential danger (e.g., dark areas, areas of known crime incidences, etc.). Likewise, in some examples, the subscriber 141-2 may inform the autonomous vehicle of the destination location when the autonomous vehicle 150 meets the subscriber 141-2 at the source location. At that time, the autonomous vehicle and/or the monitoring system 190 may determine and suggest one or more routes between the source location and the destination location. Suggested routes may be determined based on, for example, known history/incidences along potential routes, lighting along the routes, length of the routes, time of day, day of week, weather, location of other autonomous vehicles in the area, and/or other factors. For example, if there are thirty autonomous vehicles operating within the environment 105 to deliver items and/or provide safety, a route may be suggested that passes by one or more other autonomous vehicles and/or follows a path that has been recently followed by another autonomous vehicle. In such instances, the additional autonomous vehicles may increase the security and safety of the area, thereby providing safe travel for the subscriber between the source location and the destination location.

As the autonomous vehicle escorts the subscriber between the source location and the destination location, the autonomous vehicle may provide lighting for the subscriber (e.g., if the subscriber is walking, biking, etc.), as well as obtain digital video data and/or audio data of the area around and including the subscriber. The video data may be recorded locally on the autonomous vehicle and/or streamed to the monitoring system 190. Likewise, the collected data may be processed to determine potential threats to the subscriber and to determine if one or more safety measures are to be performed. For example, if another person is detected to be approaching the subscriber, the autonomous vehicle may orient a camera toward the detected person to obtain images of the person and/or output an audible notification to alert the subscriber as to the presence of the person and/or to inform the person that images have been obtained of the person for identification purposes.

In some implementations, the severity of safety measures may increase depending on the collected data. For example, if a person approaching the subscriber is detected, a first safety measure may be performed (e.g., orienting a camera toward the approaching person and obtaining images of the person). If the subscriber being escorted indicates potential danger (e.g., begins to run, requests help, screams, etc.), the autonomous vehicle may output an audible alarm, alert emergency personnel and provide the emergency personnel with position information and the digital images of the detected person, begin streaming digital video data to the emergency personnel, etc. in some implementations, the autonomous vehicle may deploy one or more autonomous aerial vehicles that include video cameras that are configured to follow the detected person and provide position information and video of the detected person until apprehended by emergency personnel, while the autonomous vehicle continues to escort the subscriber and maintain the safety of the subscriber.

Returning to FIG. 1C, the monitoring system 190 determines that autonomous vehicle 150-4 is to escort the subscriber 141-2 and sends instructions to the autonomous vehicle 150-4 to navigate from the current position to the source location 130 and provide escort for the subscriber 141-2. As discussed above, one or more factors may be considered in determining a route that the autonomous vehicle 150-4 will follow from its current location to the source location 130. Likewise, it is determined based on the time of day, which in this example is late in the evening (e.g., 9:00 pm) that the safest route 135-5 from the source location 130 to the destination location 140 is along the sidewalk 104 adjacent to the streets 102 because it is fully illuminated with streetlights. The safest route 135-5 may be provided to the subscriber as a suggested route to follow from the source location 130 to the destination location 140. However, the subscriber 141-2 may elect to take a different route and the automated vehicle will escort the subscriber along that different route.

Information or data captured by the autonomous vehicles 150 regarding the environment and navigation paths within the environment 105 may be used to update path information within the environment 105, e.g., by adding one or more new paths to the environment 105, by removing one or more existing paths from the environment 105, or by updating relevant information or data concerning an existing path within the environment 105. Information or data captured by one autonomous vehicle 150 may be utilized by one or more other autonomous vehicles.

To form navigation paths or routes between locations, the monitoring system 190 may maintain a plurality of points or nodes corresponding to locations that are connected by one or more paths extending there between. The paths, or preferred paths between points, may be determined based on one or more algorithms, formulas or techniques. Using points or nodes corresponding to locations of an origin and a destination within an environment, as well as points or nodes corresponding to locations of other points or nodes within the environment, dimensions or other attributes of roadways or pathways between such points or nodes, lighting conditions, safety measures, subscriber preference, etc., a suggested route and/or optimal route for traveling from a source location to a destination location may be calculated using one or more iterations of common mathematical principles, including but not limited to Dijkstra's Algorithm, Bellman-Ford Algorithm, Floyd-Warshall Algorithm, Johnson's Algorithm or hub labeling. A path or route between two or more locations may be defined as "shortest," "optimal," "safest," etc., on any basis, including but not limited to times of transit between the two or more points, economic costs, values of lost opportunities, potential safety and/or security risks to a subscriber being escorted, the number of subscribers the autonomous vehicle may pass as it navigates the route, or any other subjective or objective basis.

Additionally, such algorithms, formulas or techniques may also use any amount of geospatial information representative of locations corresponding to points or nodes, such as geolocations or street addresses of an origin or a destination, or of any other points or nodes, in determining an optimal route between a source location and a destination location. For example, geospatial information regarding a location may be determined by providing a street address and/or description of the location to a geocoder (e.g., a software application and/or hardware component configured to perform geocoding techniques), and a "geolocation," or a geospatially-referenced point that precisely defines an exact position in space of the location. Geospatial information may also be ascertained from geographic information system (or "GIS") data, from information received via a GPS system, e.g., data received from one or more orbiting satellites, from information obtained using cellular telephone equipment configured to estimate (e.g., triangulate) a position from one or more cellular telephone network towers or other network sources, or from information determined by any other source. Geospatial information or other location information may be expressed in a two-dimensional Cartesian format, e.g., $(x_i, y_i)$, or latitudes and longitudes, or in a three-dimensional format, e.g., $(x_i, y_i, z_i)$ or latitudes, longitudes and altitudes, of any of such points.

The systems and methods of the present disclosure are directed to defining, using and modifying navigation paths for use by one or more autonomous vehicles and/or subscribers escorted by autonomous vehicles, which may be homogenous or heterogeneous in nature. For example, the systems and methods of the present disclosure may be directed to establishing and updating navigation paths for travel by such vehicles and/or escorted subscribers based on information or data regarding aspects of traditional transportation infrastructure, e.g., locations and dimensions or other attributes of roads, sidewalks, crosswalks, bicycle or walking paths, bridges or trails, streetlights, or non-traditional transportation infrastructure, e.g., locations and dimensions of parks, fields, forests, lots, clearings or other spaces, as well as intrinsic or extrinsic information or data regarding prior transit on such networks by autonomous vehicles, including but not limited to dimensions or capacities of such vehicles (e.g., heights, lengths, widths, power levels, speeds, ranges or carrying volumes or weight limits), time stamps (e.g., times and positions of such vehicles at such times) when the vehicles are located at origins, destinations or one or more intervening waypoints along a given route, missions or tasks being performed by such vehicles (e.g., masses or numbers of items being delivered from an origin to a destination) or environmental conditions (e.g., prevailing traffic or weather) encountered by such vehicles during the performance of such missions or tasks, security measures performed by autonomous vehicles along the paths, potential safety and/or security risks, etc.

The autonomous vehicles of the present disclosure may, in some implementations, be vehicles having any number of wheels mounted to axles that may be rotated by one or more motors, with dimensions, masses or other indicators of size that may be selected on any basis. For example, in some implementations, such autonomous vehicles may be sized and configured to travel on roads at various times or during various levels of congestion, and at various speeds, e.g., in response to one or more computer-based instructions. Alternatively, in other implementations, an autonomous vehicle may be sized and configured to travel on sidewalks, crosswalks, bicycle paths, trails or the like, and at various speeds. In still other implementations, autonomous vehicles may be configured to travel on not only roads but also sidewalks, crosswalks, bicycle paths, trails or the like, at any desired speeds.

Additionally, autonomous vehicles of the present disclosure may include a cargo bay or other storage compartment, or multiple cargo bays or storage compartments, for storing items that are being delivered from a source location (e.g., fulfillment center) to a destination location (e.g., residence). Such cargo bays or storage compartments may be used to securely maintain items therein at any desired temperature, pressure or alignment or orientation, and to protect such items against the elements. Furthermore, in some implementations, the autonomous vehicles may include various equipment or components for determining whether a cargo bay or other storage compartment is empty or includes one or more items, or for identifying specific items that are stored therein, along with equipment or components for engaging or interacting with such items. The autonomous vehicles may also include one or more display screens (e.g., touchscreen displays, scanners, keypads) having one or more user interfaces for displaying information regarding such vehicles or their contents to humans, or for receiving interactions (e.g., instructions) from such humans, or other input/output devices for such purposes.

Moreover, the autonomous vehicles of the present disclosure may include any number of sensors such as position sensors (e.g., Global Positioning Satellite, or GPS, receivers), imaging sensors (e.g., digital cameras or other imaging devices) or other sensors, including but not limited to speedometers, inclinometers, compasses, altimeters, gyroscopes or scanners. The autonomous vehicles of the present disclosure may also include communications equipment (e.g., wired or wireless means for communication such as components or systems operating Wireless Fidelity, or Wi-Fi, Bluetooth, near-field communications or cellular technologies or protocols), along with one or more power modules (e.g., batteries), which may be rechargeable, refuellable or replaceable in nature. Information or data obtained or determined by such sensors or such communications equipment may be utilized in manually or automatically controlling an autonomous vehicle, e.g., in causing the autonomous vehicle to travel along paths, to search for alternate paths, or to avoid expected or unexpected hazards encountered by the autonomous vehicle within the environment. Likewise, the information or data may be used to determine whether one or more security measures are to be performed to ensure the safety of a subscriber or person being escorted by the autonomous vehicle. The autonomous vehicles of the present disclosure may further include any number of computer components (e.g., processors, data stores, transceivers or input/output devices) for performing any of the functions or accomplishing any of the missions or tasks described herein.

The navigable paths within an environment of the present disclosure may also be updated based on intrinsic or extrinsic information or data that may be determined regarding the availability of one or more new or existing paths, or the capacity of such paths to accommodate travel thereon. In particular, a navigable path within the environment may be updated based on information or data captured by sensors mounted to one or more autonomous vehicles traveling on routes extending between two or more of the points within the environment. For example, an autonomous vehicle may capture information or data regarding itself or its transit (e.g., courses, speeds, accelerations, angles of orientation such as a yaw angle, a pitch angle or a roll angle about longitudinal, lateral or transverse axes), surface conditions (e.g., whether the surfaces are wet, dry, icy, sandy, muddy or in any other condition affecting an autonomous vehicle's ability to operate under power in a forward direction or a reverse direction, or to change course), dimensions (e.g., widths or lengths of surface paths, as well as heights to one or more overhead obstructions), congestion and/or traffic (e.g., numbers or speeds of any other vehicles, pedestrians or other objects along one or more paths), weather conditions (e.g., temperatures, wind speeds, cloud cover, types or amounts of precipitation), lighting along the path, or any other indicators or factors contributing to a determination of capacity and/or safety of one or more paths between two or more points within the environment.

Information or data captured by autonomous vehicles may be transmitted to a monitoring system, or to one or more other autonomous vehicles, e.g., in real time or in near-real time, over a network and utilized in modifying not only one or more paths within the environment but also aspects of travel by autonomous vehicles along the paths, as well as suggested paths to be followed by an escorted subscriber. For example, where one autonomous vehicle determines that a series of streetlights along one path are not functioning, another autonomous vehicle may utilize information or data regarding the lighting along that path to select an alternate route as a suggested route for subscriber escort between a source location and a destination location.

Figure 2A:
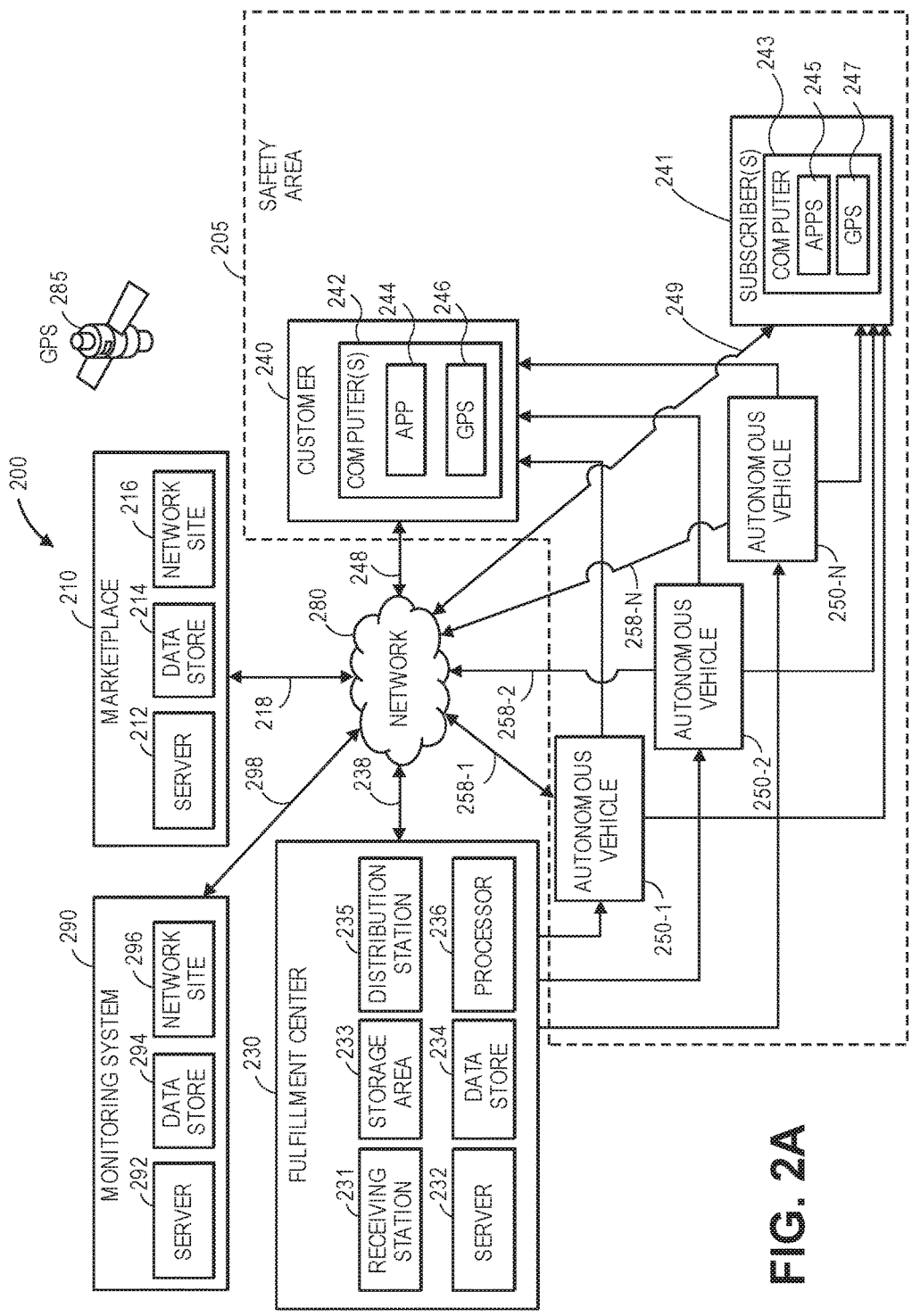
FIGS. 2A and 2B are block diagrams of components of one system, in accordance with implementations of the present disclosure.
Figure 2B:
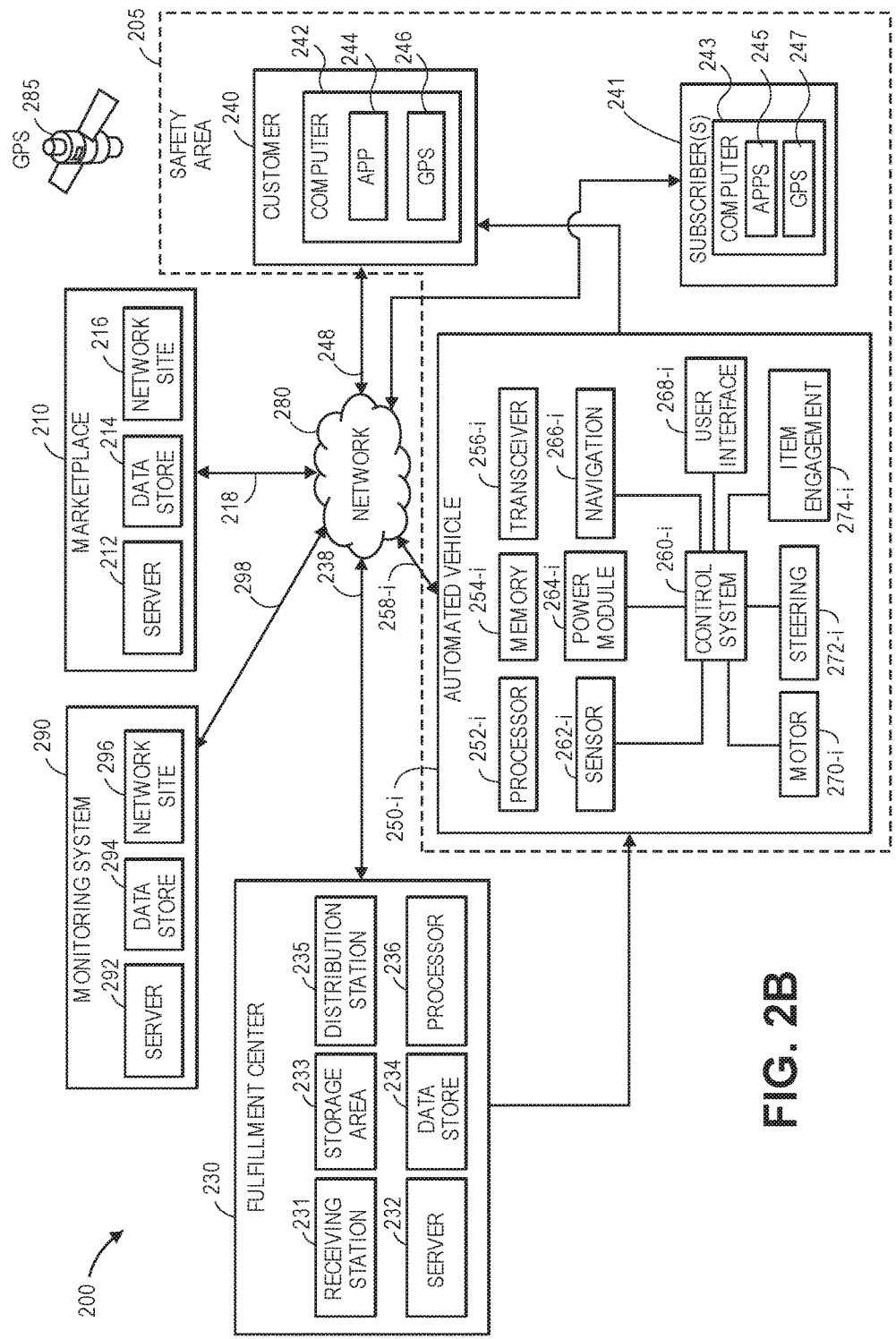

Referring to FIGS. 2A and 2B, a block diagram of components of one system 200 including a safety area in accordance with implementations of the present disclosure is shown. The system 200 includes a marketplace 210, a fulfillment center 230, a monitoring system 290, a safety area 205 that includes customer(s) 240, subscriber(s) 241, and a plurality of autonomous vehicles 250-1, 250-2 . . . 250-n. Each of the marketplace 210, fulfillment center 230, monitoring system 290, subscriber(s) 241, and a plurality of autonomous vehicles 250-1, 250-2 . . . 250-n are connected to one another across a communications network 280, which may include the Internet in whole or in part. As used herein, a customer 240 may also be a subscriber 241, a subscriber 241 may also be a customer 240. Likewise, while the example illustrated in FIGS. 2A and 2B represents the marketplace 210, monitoring system 290, and fulfillment center 230 are outside the safety area, in other implementations, one or more of the marketplace 210, monitoring system 290, and/or fulfillment center 230 may be within the safety area.

The marketplace 210 may be any entity or individual that wishes to make items from a variety of sources (e.g., vendors, manufacturers, merchants or sellers) available for download, purchase, rent, lease or borrowing by customers 240 using a networked computer infrastructure, including one or more physical computer servers 212 and data stores 214 (e.g., databases) for hosting a network site 216. The marketplace 210 may be physically or virtually associated with one or more storage or distribution facilities, such as the fulfillment center 230. The network site 216 may be implemented using the one or more servers 212, which connect or otherwise communicate with the one or more data stores 214 as well as the communications network 280, as indicated by line 218, through the sending and receiving of digital data. Moreover, the data store 214 may include any type of information regarding items that have been made available for sale through the marketplace 210, or ordered by customers, such as the customer 240, from the marketplace 210, or any information or data regarding the delivery of such items to the customers, e.g., by one or more of the autonomous vehicles 250-1, 250-2 . . . 250-n.

The fulfillment center 230 may be any facility that is adapted to receive, store, process and/or distribute items. As is shown in FIG. 2A, the fulfillment center 230 includes a server 232, a data store 234, and one or more computer processors 236. The fulfillment center 230 also includes stations for receiving, storing and distributing items to customers, including but not limited to a receiving station 231, a storage area 233 and a distribution station 235.

The server 232 and/or the processors 236 may operate one or more order processing and/or communication systems and/or software applications having one or more user interfaces, or communicate with one or more other computing devices or machines that may be connected to the communications network 280, as indicated by line 238, to transmit or receive information in the form of digital or analog data, or for any other purpose. For example, the server 232 and/or the processors 236 may also operate or provide access to one or more reporting systems for receiving or displaying information or data regarding orders for items received by the marketplace 210, or deliveries made by one or more of the autonomous vehicles 250-1, 250-2 . . . 250-n, and may provide one or more interfaces for receiving interactions (e.g., text, numeric entries or selections) from one or more operators, users, workers or other persons in response to such information or data. The server 232, the data store 234 and/or the processor 236 may be a general-purpose device or machine, or a dedicated device or machine that features any form of input and/or output peripherals such as scanners, readers, keyboards, keypads, touchscreens or like devices, and may further operate or provide access to one or more engines for analyzing the information or data regarding the workflow operations, or the interactions received from the one or more operators, users, workers or persons.

The receiving station 231 may include any apparatuses that may be required in order to receive shipments of items at the fulfillment center 230 from one or more sources and/or through one or more channels, including but not limited to docks, lifts, cranes, jacks, belts or other conveying apparatuses for obtaining items and/or shipments of items from carriers such as cars, trucks, trailers, freight cars, container ships or cargo aircraft (e.g., manned aircraft or unmanned aircraft, such as drones), and preparing such items for storage or distribution to customers. The storage area 233 may include one or more predefined two-dimensional or three-dimensional spaces for accommodating items and/or containers of such items, such as aisles, rows, bays, shelves, slots, bins, racks, tiers, bars, hooks, cubbies or other like storage means, or any other appropriate regions or stations. The distribution station 235 may include one or more regions or stations where items that have been retrieved from a designated storage area may be evaluated, prepared and packed for delivery from the fulfillment center 230 to addresses, locations or destinations specified by customers, e.g., by way of one or more of the autonomous vehicles 250-1, 250-2 . . . 250-$n$, as well as carriers such as cars, trucks, trailers, freight cars, container ships or cargo aircraft (e.g., manned aircraft or unmanned aircraft, such as drones). Those of ordinary skill in the pertinent art will recognize that shipments of items arriving at the receiving station 231 may be processed, and the items placed into storage within the storage areas 233 or, alternatively, transferred directly to the distribution station 235, or "cross-docked," for prompt delivery to one or more customers.

The fulfillment center 230 may further include one or more control systems that may generate instructions for conducting operations at one or more of the receiving station 231, the storage area 233 or the distribution station 235. Such control systems may be associated with the server 232, the data store 234 and/or the processor 236, or with one or more other computing devices or machines, and may communicate with the receiving station 231, the storage area 233 or the distribution station 235 within the fulfillment center 230 by any known wired or wireless means, or with the marketplace 210, the customer 240 or one or more of the autonomous vehicles 250-1, 250-2 . . . 250-$n$ over the communications network 280, as indicated by line 238, through the sending and receiving of digital data.

Additionally, the fulfillment center 230 may include one or more systems or devices (not shown in FIG. 2A or FIG. 2B) for determining locations of one or more elements therein, such as cameras or other image recording devices. Furthermore, the fulfillment center 230 may also include one or more workers or staff members, who may handle or transport items within the fulfillment center 230. Such workers may operate one or more computing devices or machines for registering the receipt, retrieval, transportation or storage of items within the fulfillment center, or a general-purpose device such a personal digital assistant, a digital media player, a smartphone, a tablet computer, a desktop computer or a laptop computer, and may include any form of input and/or output peripherals such as scanners, readers, keyboards, keypads, touchscreens or like devices.

The customer 240 may be any entity or individual that wishes to download, purchase, rent, lease, borrow or otherwise obtain items (which may include goods, products, services or information of any type or form) from the marketplace 210, e.g., for delivery by one or more of the autonomous vehicles 250-1, 250-2 . . . 250-$n$. The customer 240 may utilize one or more computing devices 242 (e.g., a smartphone, a tablet computer, a laptop computer, a desktop computer, or computing devices provided in wristwatches, televisions, set-top boxes, automobiles or any other appliances or machines), or any other like machine, that may operate or access one or more software applications 244, such as a web browser or a shopping application, and may be connected to or otherwise communicate with the marketplace 210, the fulfillment center 230 or the autonomous vehicles 250-1, 250-2 . . . 250-$n$ through the communications network 280, as indicated by line 248, by the transmission and receipt of digital data. The computing devices 242 may also include a location determining component, such as a GPS receiver 246 that can be used to determine and provide position information with respect to the device and/or the customer 240. A customer may likewise be a subscriber 241.

The subscriber 241 may be any entity or individual that wishes to utilize one or more autonomous vehicles 250-1, 250-2 . . . 250-$n$ to receive safety escorts within a safety area and/or to have autonomous vehicles periodically check the security, health, etc., of the subscriber 241 when the subscriber is located within the safety area 205. The subscriber 241 may utilize one or more computing devices 243 (e.g., a smartphone, a tablet computer, a laptop computer, a desktop computer, or computing devices provided in wristwatches, televisions, set-top boxes, automobiles or any other appliances or machines), or any other like machine, that may operate or access one or more software applications 245, such as a web browser or a subscriber application, and may be connected to or otherwise communicate with the monitoring system 290 and/or the autonomous vehicles 250-1, 250-2 . . . 250-$n$ through the communications network 280, as indicated by line 249, by the transmission and receipt of digital data. The computing devices 243 may also include a location determining component, such as a GPS receiver 247 that can be used to determine and provide position information with respect to the device and/or the subscriber 241. A subscriber 241 may likewise be a customer 240.

The safety area 205 includes any defined area in which the one or more autonomous vehicles 250-1, 250-2 . . . 250-$n$ are configured to provide security and/or escorts to subscribers 241 located within the area. For example, a safety area may be a college campus, a parking lot, a neighborhood, or any other geographic area where the one or more autonomous vehicles 250-1, 250-2 . . . 250-$n$ may operate. In addition to providing safety escorts and/or security to subscribers 241, the one or more autonomous vehicles 250-1, 250-2 . . . 250-$n$ may likewise provide security, such as a mobile security station, to any entity or other individual within the safety area, regardless of whether that entity or individual is a subscriber and/or customer.

The autonomous vehicles 250-1, 250-2 . . . 250-$n$ may be any type or form of self-powered vehicle capable of being programmed or otherwise configured for autonomous travel between two points of a navigation path, in furtherance of the performance of one or more missions or tasks, such as the delivery of an item from the fulfillment center 230 to the customer 240, escort of a subscriber between two points within the safety area, functioning as a mobile security station, etc., based on one or more computer instructions. Each of the autonomous vehicles 250-1, 250-2 . . . 250-n shown in FIG. 2A, which are represented in FIG. 2B as an autonomous vehicle 250-i, may include one or more computer components such as a processor 252-i, a memory 254-i and a transceiver 256-i in communication with one or more other computer devices that may be connected to the communications network 280, as indicated by line 258-i, in order to transmit or receive information in the form of digital or analog data, or for any other purpose. For example, the autonomous vehicle 250-i may receive instructions or other information or data via the transceiver 256-i regarding an item that is to be delivered from the fulfillment center 230 to the customer 240, and/or receive instructions of a subscriber 241 that is to be escorted between two points within the safety area 205. The transceiver 256-i may be configured to enable the automated vehicle 250-i to communicate through one or more wired or wireless means, e.g., wired technologies such as Universal Serial Bus (or "USB") or fiber optic cable, or standard wireless protocols such as Bluetooth® or any Wireless Fidelity (or "Wi-Fi") protocol, such as over the communications network 280 or directly.

The transceiver 256-i may further include or be in communication with one or more input/output (or "I/O") interfaces, network interfaces and/or input/output devices, and may be configured to allow information or data to be exchanged between one or more of the sensors or other components of the autonomous vehicle 250-i, or to one or more other computer devices or systems (e.g., aerial vehicles, other autonomous vehicles) via the communications network 280. For example, in some implementations, the transceiver 256-i may be configured to coordinate I/O traffic between the processor 252-i and one or more onboard or external computer devices or components. The transceiver 256-i may perform any necessary protocol, timing or other data transformations to convert data signals from a first format suitable for use by one component into a second format suitable for use by another component. In some implementations, the transceiver 256-i may include support for components attached through various types of peripheral buses, e.g., variants of the Peripheral Component Interconnect (PCI) bus standard or the Universal Serial Bus (USB) standard. In some other implementations, functions of the transceiver 256-i may be split into two or more separate components, or incorporated directly into the processor 252-i.

As is also shown in FIG. 2B, the autonomous vehicle 250-i further includes one or more control systems 260-i, as well as one or more sensors 262-i, one or more power modules 264-i, one or more navigation modules 266-i, and one or more user interfaces 268-i. Additionally, the autonomous vehicle 250-i further includes one or more motors 270-i, one or more steering systems 272-i and one or more item engagement systems (or devices) 274-i.

The control system 260-i may include one or more software applications or hardware components configured for controlling or monitoring operations of one or more components such as the sensor 262-i, the power module 264-i, the navigation module 266-i, or the user interfaces 268-i, as well as the motors 270-i, the steering systems 272-i and the item engagement systems 274-i, e.g., by receiving, generating, storing and/or transmitting one or more computer instructions to such components. The control system 260-i may communicate with the marketplace 210, the fulfillment center 230 and/or the customer 240 over the communications network 280, as indicated by line 258-i, through the sending and receiving of digital data.

The sensor 262-i may be a position sensor such as a GPS receiver in communication with one or more orbiting satellites or other components of a GPS system 285, or any other device or component for determining geolocations (e.g., geospatially-referenced point that precisely defines an exact location in space with one or more geocodes, such as a set of geographic coordinates, e.g., a latitude and a longitude, and, optionally, an elevation that may be ascertained from signals (e.g., trilateration data or information) or geographic information system (or "GIS") data), of the autonomous vehicle 250-i. Geolocations of the sensor 262-i may be associated with the autonomous vehicle 250-i, where appropriate.

The sensor 262-i may also be an imaging device including any form of optical recording sensor or device (e.g., digital cameras, depth sensors or range cameras, infrared cameras, radiographic cameras, thermographic cameras, and/or other optical sensors) that may be configured to photograph or otherwise capture visual information or data (e.g., still or moving images in color or black and white that may be captured at any frame rates, or depth imaging data such as ranges), or associated audio information or data, or metadata, regarding objects or activities occurring within a vicinity of the autonomous vehicle 250-i. For example, the sensor 262-i may be configured to capture or detect reflected light if the reflected light is within a field of view of the sensor 262-i, which is defined as a function of a distance between an imaging sensor and a lens within the sensor 262-i, viz., a focal length, as well as a location of the sensor 262-i and an angular orientation of the lens. Accordingly, where an object appears within a depth of field, or a distance within the field of view where the clarity and focus is sufficiently sharp, the sensor 262-i may capture light that is reflected off objects of any kind to a sufficiently high degree of resolution using one or more sensors thereof, and store information regarding the reflected light in one or more data files and/or transmit the data over the network 280 to the monitoring system 290.

The sensor 262-i may also include manual or automatic features for modifying a field of view or orientation. For example, the sensor 262-i may be a digital camera configured in a fixed position, or with a fixed focal length (e.g., fixed-focus lenses) or angular orientation. Alternatively, the sensor 262-i may include one or more actuated or motorized features for adjusting a position of the sensor 262-i, or for adjusting either the focal length (e.g., zooming the imaging device) or the angular orientation (e.g., the roll angle, the pitch angle or the yaw angle), by causing a change in the distance between the imaging sensor and the lens (e.g., optical zoom lenses or digital zoom lenses), a change in the location of the sensor 262-i, or a change in one or more of the angles defining the angular orientation of the sensor 262-i.

For example, the sensor 262-i may be an imaging device that is hard-mounted to a support or mounting that maintains the imaging device in a fixed configuration or angle with respect to one, two or three axes. Alternatively, however, the sensor 262-i may be provided with one or more motors and/or controllers for manually or automatically operating one or more of the components, or for reorienting the axis or direction of the sensor 262-i, i.e., by panning or tilting the sensor 262-i. Panning the sensor 262-i may cause a rotation within a horizontal plane or about a vertical axis (e.g., a yaw), while tilting the sensor 262-i may cause a rotation within a vertical plane or about a horizontal axis (e.g., a pitch). Additionally, the sensor 262-*i* may be rolled, or rotated about its axis of rotation, and within a plane that is perpendicular to the axis of rotation and substantially parallel to a field of view of the sensor 262-*i*.

Imaging data (e.g., still or moving images, as well as associated audio data or metadata) captured using the sensor 262-*i* may be processed according to any number of recognition techniques. In some implementations, edges, contours, outlines, colors, textures, silhouettes, shapes or other characteristics of objects, or portions of objects, expressed in still or moving digital images may be identified using one or more algorithms or machine-learning tools. The objects or portions of objects may be stationary or in motion, and may be identified at single, finite periods of time, or over one or more periods or durations. Such algorithms or tools may be directed to recognizing and marking transitions (e.g., the edges, contours, outlines, colors, textures, silhouettes, shapes or other characteristics of objects or portions thereof) within the digital images as closely as possible, and in a manner that minimizes noise and disruptions, and does not create false transitions. Some detection algorithms or techniques that may be utilized to recognize characteristics of objects or portions thereof in digital images in accordance with the present disclosure include, but are not limited to, Canny edge detectors or algorithms; Sobel operators, algorithms or filters; Kayyali operators; Roberts edge detection algorithms; Prewitt operators; Frei-Chen methods; or any other algorithms or techniques that may be known to those of ordinary skill in the pertinent arts.

The sensor 262-*i* may further be one or more compasses, speedometers, altimeters, thermometers, barometers, hygrometers, gyroscopes, air monitoring sensors (e.g., oxygen, ozone, hydrogen, carbon monoxide or carbon dioxide sensors), artificial olfaction device (also known as an electronic nose or e-nose) to detect smells and/or chemicals, ozone monitors, pH sensors, magnetic anomaly detectors, metal detectors, radiation sensors (e.g., Geiger counters, neutron detectors, alpha detectors), accelerometers, ranging sensors (e.g., radar or LIDAR ranging sensors), sound sensors (e.g., microphones, piezoelectric sensors, vibration sensors or other transducers for detecting and recording acoustic energy from one or more directions), distance detection sensors (e.g., light detection and ranging (LIDAR), sound navigation and ranging (SONAR), radio detection and ranging (RADAR)), etc.

The sensor 262-*i* may also be an item identification sensor, including a bar code scanner, a radiofrequency identification (or RFID) reader, or other technology that is utilized to determine an identification of an item that is being retrieved or deposited, or has been retrieved or deposited, by the autonomous vehicle 250-*i*. In some implementations, the sensor 262-*i* may be provided within a cargo bay or other storage component of the autonomous vehicle 250-*i*, such as a presence detection sensor and/or a motion sensor for detecting the presence or absence of one or more objects within the cargo bay or storage compartment, or movement of objects therein.

The sensor 262-*i* may be further configured to capture, record and/or analyze information or data regarding its positions, velocities, accelerations or orientations of the autonomous vehicle 250-*i*, and to analyze such data or information by one or more means, e.g., by aggregating or summing such data or information to form one or more qualitative or quantitative metrics of the movement of the sensor 262-*i*. For example, a net vector indicative of any and all relevant movements of the autonomous vehicle 250-*i*, including but not limited to physical positions, velocities, accelerations or orientations of the sensor 262-*i*, may be derived. Additionally, coefficients or scalars indicative of the relative movements of the autonomous vehicle 250-*i* and/or objects around the autonomous vehicle 250-*i*, may also be defined.

The power module 264-*i* may be any type of power source for providing electrical power, mechanical power or other forms of power in support of one or more electrical or mechanical loads aboard the autonomous vehicle 250-*i*. In some implementations, the power module 264-*i* may include one or more batteries or other power cells, e.g., dry cell or wet cell batteries such as lead-acid batteries, lithium ion batteries, nickel cadmium batteries or nickel metal hydride batteries, or any other type, size or form of batteries. The power module 264-*i* may each have any cell voltages, peak load currents, charge times, specific energies, internal resistances or cycle lives, or other power ratings. The power module 264-*i* may also be any type, size or form of other power source, e.g., other than a battery, including but not limited to more fuel cells, turbines, solar cells or nuclear reactors. Alternatively, the power module 264-*i* may be another form of prime mover (e.g., electric, gasoline-powered or any other type of motor) capable of generating sufficient mechanical forces for the autonomous vehicle 250-*i*.

The navigation module 266-*i* may include one or more software applications or hardware components including or having access to information or data regarding aspects of navigation paths, including the locations, dimensions, capacities, conditions, statuses or other attributes of the paths. For example, the navigation module 266-*i* may receive inputs from the sensor 262-*i*, e.g., from a GPS receiver, an imaging device or another sensor, and determine a direction and/or a speed of the autonomous vehicle 250-*i* for travelling on a given path based on such inputs. The navigation module 266-*i* may select a path to be traveled upon by the autonomous vehicle 250-*i*, and may provide information or data regarding the selected path to the control system 260-*i*.

The user interface 268-*i* may be configured to receive and provide information to human users (subscribers, non-subscribers) of the autonomous vehicle 250-*i* and may include, but is not limited to, a display, (e.g., a touch-screen display), a projector, a scanner, a keypad, a braille keypad, a biometric scanner, an audio transducer, one or more speakers, one or more microphones, one or more imaging devices such as a video camera, and any other types of input or output devices that may support interaction between the autonomous vehicle 250-*i* and a human user. In various implementations, the user interface 268-*i* may include a variety of different features. For example, in one implementation, the user interface 268-*i* may include a relatively small display and/or a keypad for receiving inputs from human users. In other implementations, inputs for controlling the operation of the autonomous vehicle 250-*i* may be provided remotely. For example, to access a storage compartment, a human user may send a text message to or reply to a text message from the control system 260-*i* and request that a door or other access portal be opened to enable the user to access an item therein. As another example, to request a safety escort, a human user may send a text message to or reply to a text message from the control system 260-*i* and request that the autonomous vehicle meet the user at a source location and provide a safety escort for the user. In various implementations, the autonomous vehicle 250-*i* may have capabilities for directly receiving such signals from a user device or other device (e.g., a device inside a user's residence). In other implementations, the request from the user may be transmitted to the monitoring system 290 and the monitoring system may send instructions to the automated vehicle 250-*i* for execution.

The motor 270-*i* may be any type or form of motor or engine (e.g., electric, gasoline-powered or any other type of motor) that is capable of providing sufficient rotational forces to one or more axles, shafts and/or wheels for causing the autonomous vehicle 250-*i* and any items therein to travel in a desired direction and at a desired speed. In some implementations, the autonomous vehicle 250-*i* may include one or more electric motors having any number of stators, poles and/or windings, such as an outrunner or an inrunner brushless direct current (DC) motor, or any other motors, having any speed rating, power rating or any other rating.

The steering system 272-*i* may be any system for controlling a direction of travel of the autonomous vehicle 250-*i*. The steering system 272-*i* may include any number of automatically operable gears (e.g., racks and pinions), gear boxes, shafts, shaft assemblies, joints, servos, hydraulic cylinders, linkages or other features for repositioning one or more wheels to cause the autonomous vehicle 250-*i* to travel in a desired direction.

The item engagement system 274-*i* may be any mechanical component, e.g., a robotic arm, for engaging an item or for disengaging the item, as desired. For example, when the autonomous vehicle 250-*i* is tasked with delivering an item from a source location to a destination location, the item engagement system 274-*i* may be used to engage the item at the source location and to deposit the item in a cargo bay or another storage compartment prior to departing. After the autonomous vehicle 250-*i* arrives at the destination location, the item engagement system 274-*i* may be used to retrieve the item within the cargo bay or storage compartment, and deposit the item in a desired location at the destination.

Any combination of networks or communications protocols may be utilized in accordance with the systems and methods of the present disclosure. For example, each of the automated vehicles 250-1, 250-2 . . . 250-*n* may be configured to communicate with one another or with the marketplace server 212, the fulfillment center server 232 and/or the devices 242 via the communications network 280, such as is shown in FIGS. 2A and 2B, e.g., via an open or standard protocol such as Wi-Fi. Alternatively, each of the autonomous vehicles 250-1, 250-2 . . . 250-*n* may be configured to communicate with one another directly outside of a centralized network, such as the communications network 280, e.g., by a wireless protocol such as Bluetooth, in which two or more of the autonomous vehicles 250-1, 250-2 . . . 250-*n* may be paired with one another.

In some implementations, autonomous vehicles within a defined distance may wirelessly connect and/or provide wireless access points (aka, hotspots) to persons in the area of the autonomous vehicles. For example, a plurality of autonomous vehicles may wirelessly connect and allow connections from other devices (e.g., smartphones, laptops, tablets, reading devices, etc.) to provide network connectivity for those devices through the autonomous vehicles. Using such a configuration, persons in the area can obtain digital content from the autonomous vehicle, access the Internet, etc. Likewise, in some examples, the wireless network formed by the autonomous vehicles may be utilized to securely access and/or communicate with the autonomous vehicles. For example, a subscriber may utilize a device, such as a smartphone, that is wirelessly connected to one or more autonomous vehicles to, for example, order items from the autonomous vehicle, request an escort from the autonomous vehicle, etc.

The monitoring system 290 includes one or more physical computer servers 292 having a plurality of databases 294 associated therewith, as well as one or more computer processors 296 provided for any specific or general purpose. The servers 292 may be connected to or otherwise communicate with the databases 294 and the processors 296. The databases 294 may store any type of information or data, including but not limited to acoustic signals, information or data relating to acoustic signals, or information or data regarding customers, subscribers, and/or their attributes, interests or preferences, for any purpose. The servers 292 and/or the computer processors 296 may also connect to or otherwise communicate with the communications network 280, as indicated by line 298, through the sending and receiving of digital data. For example, the monitoring system 290 may include any facilities, stations or locations having the ability or capacity to receive and store information or data in one or more data stores, e.g., data files received from any of the autonomous vehicles 250-1, 250-2 . . . 250-*n*, and/or one or more other external computer systems via the communications network 280. In some implementations, the monitoring system 290 may be provided in a physical location. In other such implementations, the data monitoring system 290 may be provided in one or more alternate or virtual locations, e.g., in a "cloud"-based environment. In still other implementations, the monitoring system 290 may be provided onboard one or more of the autonomous vehicles 250-1, 250-2 . . . 250-*n*.

For example, the monitoring system 290 of FIG. 2 may be independently provided for the purpose of defining navigation paths having a plurality of points based on attributes of a given mission or task, attributes of one or more of the autonomous vehicles 250-1, 250-2 . . . 250-*n*, or attributes of physical and/or geographic features within a given environment, including but not limited to locations, dimensions, lighting, or other attributes of roads, sidewalks, crosswalks, bicycle or walking paths, bridges or trails, or non-traditional transportation infrastructure, such as parks, fields, forests, lots, clearings or other spaces. The number and/or type of physical and/or geographic features that may be evaluated and considered for inclusion in a navigation path by the monitoring system 290, and the number and/or type of points that may be included in such a navigation path, are not limited.

In some implementations, the monitoring system 290 of FIG. 2 may also be provided for the purpose of receiving, tracking and/or otherwise monitoring the operations of one or more of the autonomous vehicles 250-1, 250-2 . . . 250-*n*, including but not limited to any information or data regarding attributes of the autonomous vehicles 250-1, 250-2 . . . 250-*n*, or missions or tasks being performed by the autonomous vehicles 250-1, 250-2 . . . 250-*n*, as well as environmental conditions, traffic conditions, ground or surface conditions, weather conditions, planned or ongoing construction or other events, or any other factors that may affect the capacity of one or more paths within an environment and/or the security or health of one or more subscribers within a safety area.

For example, the monitoring system 290 may receive information or data regarding a mission or task to be performed, e.g., a delivery of an item from an origin to a destination, and may identify a plurality of routes between two or more points within the environment, and may select one or more of such paths for the execution of the mission or task by one or more of the autonomous vehicles 250-1, 250-2 . . . 250-n based on how many other subscribers the autonomous vehicle will potentially encounter as the autonomous vehicle navigates the route. The monitoring system 290 may further provide instructions to one or more of the autonomous vehicles 250-1, 250-2 . . . 250-n, indicating a route to be traveled between two or more points, including times and dates at which an autonomous vehicle has arrived at or departed from one or more of such points. The monitoring system 290 may be further configured to receive information or data regarding changes to any of the attributes regarding a given mission or task, changes to any of the attributes of any of the autonomous vehicles 250-1, 250-2 . . . 250-n, updates to a path being followed to escort a subscriber between locations, or changes to any of the attributes of the physical and/or geographic features of the environment. Information or data regarding such changes may be received from any intrinsic or extrinsic sources, including but not limited to one or more networked computer systems, e.g., over the communications network 280, or from one or more of the autonomous vehicles 250-1, 250-2 . . . 250-n. For example, the monitoring system 290 may include information or data such as a speed, a course, a position (e.g., a latitude and a longitude), an elevation, an angle of orientation (e.g., a yaw, a pitch or a roll) of an autonomous vehicle, as well as information or data regarding environmental or surface conditions, traffic conditions, lighting, congestion or any other relevant factors regarding a given path.

The monitoring system 290 may also be configured to determine whether a route being traveled by one or more of the autonomous vehicles 250-1, 250-2 . . . 250-n remains optimal or preferred for a given autonomous vehicle and/or task, or to communicate instructions for varying the route. The number and/or type of information or data that may be received and/or processed or utilized by the monitoring system 290 are not limited.

Those of ordinary skill in the pertinent arts will understand that process steps described herein as being performed by a "marketplace," a "fulfillment center" a "customer," "a subscriber," an "autonomous vehicle," a "monitoring system" or like terms, may be automated steps performed by their respective computer systems, or implemented within software modules (or computer programs) executed by one or more general purpose computers. Moreover, process steps described as being performed by a "marketplace," a "fulfillment center," a "customer," "a subscriber," an "autonomous vehicle" or a "monitoring system" may be typically performed by a human operator, but could, alternatively, be performed by an automated agent.

The marketplace 210, the fulfillment center 230, the customer 240, the subscriber 241, the autonomous vehicles 250-1, 250-2 . . . 250-n, and/or the monitoring system 290 may use any web-enabled or Internet applications or features, or any other client-server applications or features including electronic mail (or E-mail), or other messaging techniques, to connect to the communications network 280 or to communicate with one another, such as through short or multimedia messaging service (SMS or MMS) text messages. For example, the fulfillment center 230 and/or the server 232 may be adapted to transmit information or data in the form of synchronous or asynchronous messages to the marketplace 210 and/or the server 212, the customer 240 and/or the computing device 242, the autonomous vehicles 250-1, 250-2 . . . 250-n and/or the control system 260-i or the monitoring system 290, or any other computer device in real time or in near-real time, or in one or more offline processes, via the communications network 280. Those of ordinary skill in the pertinent art would recognize that the marketplace 210, the fulfillment center 230, the customer 240, the subscriber 241, the autonomous vehicles 250-1, 250-2 . . . 250-n or the monitoring system 290 may operate any of a number of computing devices that are capable of communicating over the network, including but not limited to set-top boxes, personal digital assistants, digital media players, web pads, laptop computers, desktop computers, electronic book readers, and the like. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as the servers 212, 232, 292, the computing devices 242, the processors 252-i, 296, or any other computers or control systems utilized by the marketplace 210, the fulfillment center 230, the customer 240, the subscriber 241, the autonomous vehicles 250-1, 250-2 . . . 250-n, the monitoring system 290, and having sequences of instructions which, when executed by a processor (e.g., a central processing unit, or "CPU"), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some implementations of the systems and methods of the present disclosure may also be provided as a computer executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, implementations may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

As is discussed above, autonomous vehicles traveling throughout an environment and/or within the safety area may remain in communication with a monitoring system, other autonomous vehicles, and/or other networked computer systems. The autonomous vehicles may transmit information or data (e.g., imaging data of any type or form) regarding their past, present or future operations and/or environmental surroundings to the monitoring system, e.g., their respective speeds, courses, positions (e.g., latitudes and longitudes), elevations or angles of orientation (e.g., yaws, pitches or rolls), environmental or surface conditions, traffic conditions, congestion or any other relevant factors encountered by the autonomous vehicles to the monitoring system or other networked computer systems, as well as images and/or audio of the environment in which the autonomous vehicle is operating.

Figure 3:
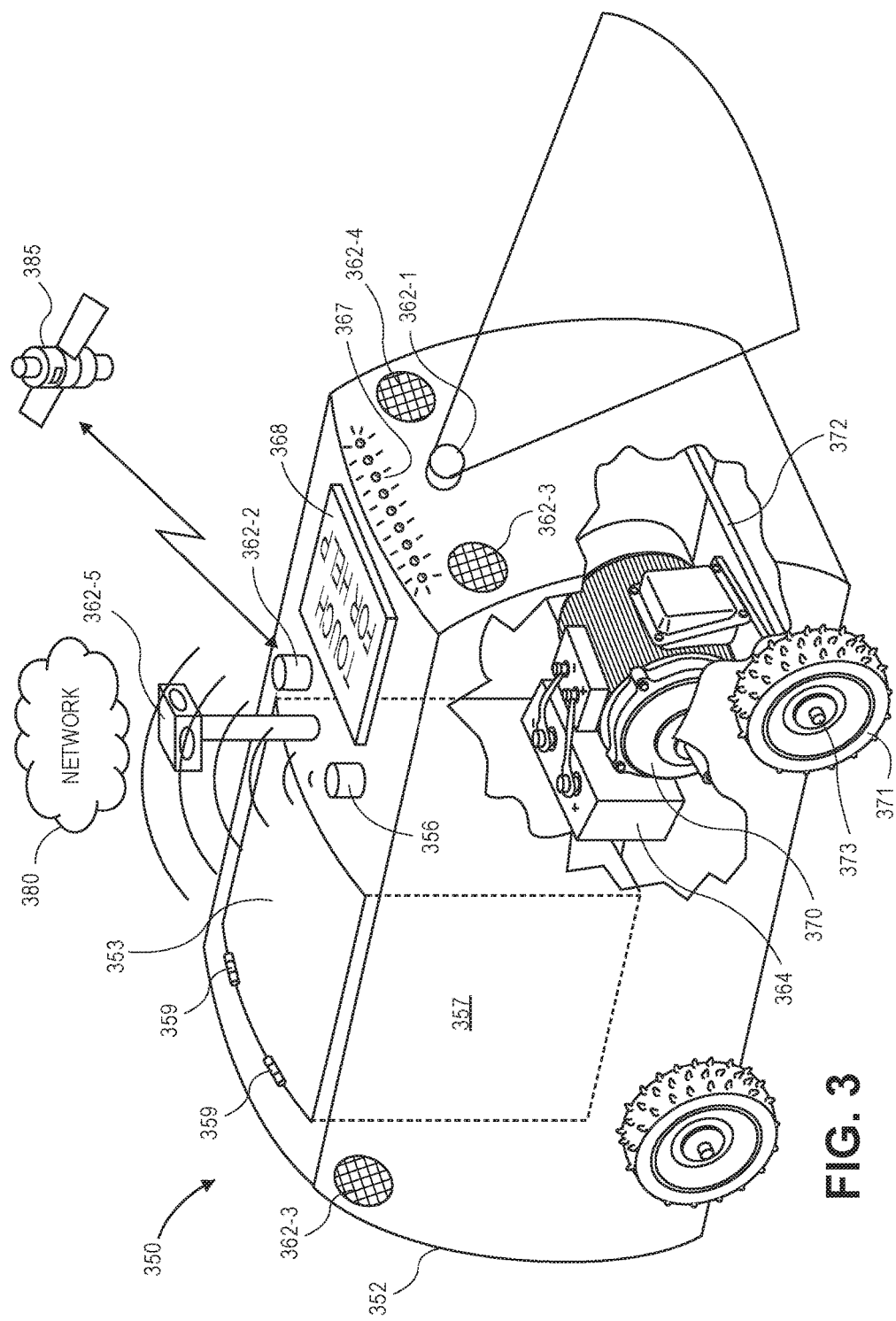
FIG. 3 is a view of one autonomous vehicle, in accordance with implementations of the present disclosure.

FIG. 3 illustrates a view of one autonomous vehicle 350 configured for ground based travel, in accordance with implementations of the present disclosure. As is shown in FIG. 3, the autonomous vehicle 350 includes a frame 352, a storage compartment 357, a pair of axles 373 and a plurality of wheels 371 joined to the axles 373. A front surface of the frame 352 includes an imaging device 362-1 having a field of view aligned in a forward direction or orientation with respect to the autonomous vehicle 350 and an array of lights 367. Likewise, an adjustable imaging device structure 362-5 that includes a plurality of imaging components arranged to capture a 360-degree view of the area surrounding the autonomous vehicle may be coupled to and extendable from a top of the autonomous vehicle. As will be appreciated, the autonomous vehicle 350 may include any number of imaging devices 362-1, with fields of view that may be permanently or adjustably aligned in any direction or orientation with respect to the autonomous vehicle 350. In some implementations, the autonomous vehicle 350 may include any number of lights, on any surface thereof, and one or more of the lights may include light emitting diodes (LEDs) or other light sources. The autonomous vehicle 350 may also include one or more speakers 362-3 and/or one or more microphones 362-4 positioned about the frame of the autonomous vehicle 350.

An upper surface of the frame 352 includes a door 353 providing access to the storage compartment 357 that is rotatably connected by a pair of hinges 359. The door 353 may include any number of manual or automatic features for causing the opening or closing thereof, and may include any suitable dimensions with respect to the dimensions of the storage compartment 357. In some implementations, the autonomous vehicle 350 may include doors 353 on any surface thereof, and any number of storage compartments 357 of any size or shape. The upper surface of the frame 352 further includes a transceiver 356 (e.g., a Wi-Fi transmitter and receiver) for communicating with a network 380, which may include the Internet in whole or in part, as well as a GPS receiver 362-2, which may receive geolocation data from or transmit geolocation data to a GPS network 385. The upper surface of the frame 352 further includes a user interface 368 which may receive interactions from a human user, or display information to the human user, as appropriate. In some implementations, the GPS receiver 362-2, and/or the user interface 368 may be provided on any other surface of the frame 352.

As is shown in FIG. 3, the autonomous vehicle 350 may include a power module 364 (e.g., a battery), a motor 370 (e.g., a DC electric motor operating at twelve to forty-eight volts) and a steering component 372 (e.g., one or more racks or pinions for automatically changing a direction of travel of the autonomous vehicle 350 and/or an orientation of one or more of axles 373 or the wheels 371. The motor 370 may be configured to operate at any speed or have any power rating, and to cause the autonomous vehicle 350 to travel in a forward direction of travel, a reverse direction of travel or in any other direction of travel as determined by the steering component 372. Additionally, the axles 373 and wheels 371 of the autonomous vehicle 350 may also have any dimension. For example, the wheels 371 may have bores or axle pads for accommodating axles 373 of any diameter or thickness, and any number of spokes or other extensions for supporting a rim having any desired spacings or offsets for accommodating tires or other coverings. Each of the axles 373 may be joined to and configured to rotate any number of wheels 371, which may include tires or other coverings of any suitable material, including but not limited to rubbers and/or plastics. The wheels 371 or tires thereon may feature any number of belts, walls, treads or other components, and may be pneumatic or solid, or take any other form.

Figure 4:
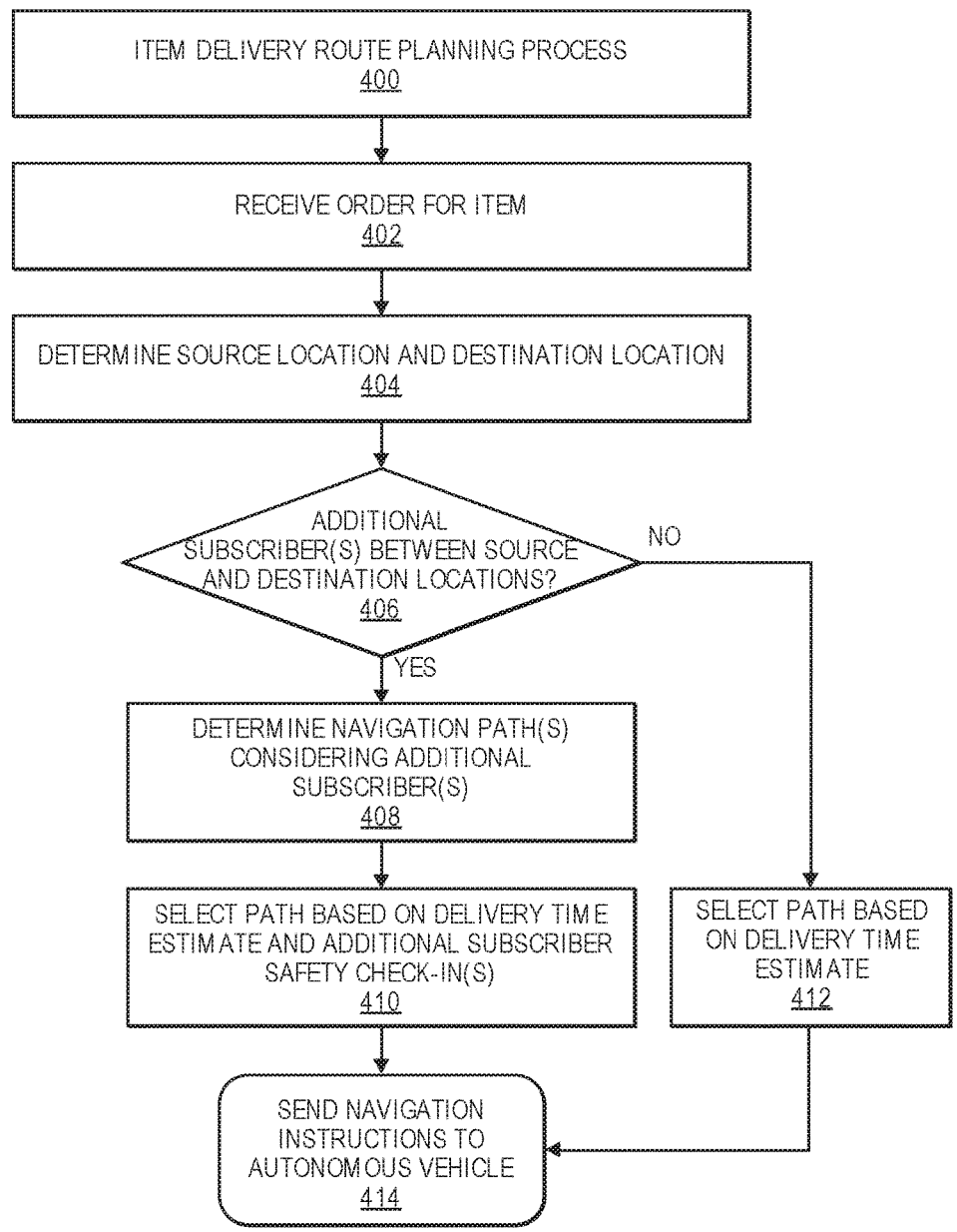
FIG. 4 is a flow diagram of an example item delivery route planning process 400, in accordance with implementations of the present disclosure.

FIG. 4 is a flow diagram of an example item delivery route planning process 400, in accordance with implementations of the present disclosure. The example process 400 begins upon receipt of an order for an item from a customer, as in 402. As discussed above, in some implementations, a customer may order an item for delivery by an autonomous vehicle, from, for example, an electronic marketplace. The item may be stored in inventory at a fulfillment center, stored or maintained at a residence, merchant location, or any other location from which an item may be shipped.

Upon receipt of the order for the item, a source location and a delivery location are determined, as in 404. The source location is the location from which the item is to be retrieved for delivery (e.g., fulfillment center, merchant residence, etc.). The destination location is the location to which the item is to be delivered. For example, the customer may specify a physical destination location, such as their home address, business address, etc. In other implementations, the destination location may correspond to a geographic location, such as the current location of the customer. Likewise, in some implementations, the destination location may change up to the point of delivery of the item to the destination location. For example, if the destination location is the current location of the customer, which may be determined based on GPS information obtained from a customer device of the customer, the destination location may be updated as the customer moves locations. In one example, the customer may order an item and select the destination location as "bring it to me" and the customer's device will periodically provide position information (e.g., GPS data) as to the customer's current location. If the customer moves locations, the destination location may be updated to correspond to the updated location of the customer.

In addition to determining the source location of the item and the destination location for delivery, a determination is made as to whether one or more subscribers are located between the source location and the destination and/or if a safety area encompasses one or more of the source location and the destination location, as in 406. As discussed above, a safety area may include any geographic area in which autonomous vehicles are located that may provide safety (e.g., escort), mobile security stations, and/or safety check-ins with customers. For example, a safety area may include a college campus, a city, a state, a country, etc. In other examples, a safety area may not be a fixed location and/or have a fixed size. In contrast, in some examples, a safety area may exist around the current location of each subscriber that has requested to receive periodic safety check-ins. In such an example, it may be determined that a safety area or multiple safety areas exist between the source location and the destination location and if one or more subscribers are located between the source location and the destination location.

If it is determined that one or more subscribers and/or a safety area exists between the source location and destination location and/or encompasses one or more of the source location and destination location, one or more navigation paths through the safety area are determined that will route the autonomous vehicle within a defined distance of the position of the one or more subscribers and/or within a defined distance of one or more subscribers positioned within the safety area, as in 408. For example, an application or device of each subscriber may periodically provide position information to the example process 400. Likewise, the last safety check-in for each subscriber may be maintained by the example process 400. Utilizing one or more of the position of subscribers within the safety area, time since last check-in for those subscribers, the source location, and the destination location, one or more navigation paths for routing the item package using an autonomous vehicle between the source location and the destination location is determined. A navigation path may be a shortest and/or fasted route between the source location and the destination location. In other examples, a navigation path may route the autonomous vehicle within a defined distance of any subscriber located in the safety area that has not received a safety check-in within a defined period of time (e.g., within the past hour). Another navigation path may route the autonomous vehicle past subscribers located in the safety area that are within a defined distance of a shortest or fastest route between the source location and the destination location. Other example navigation paths may likewise be envisioned with the implementations discussed herein.

For each determined navigation path between the source location and the destination location, an estimated delivery time is determined. The estimated delivery time may consider estimated speeds of the autonomous vehicle as it traverses the navigation path, and estimated times for each of the safety check-in that are to occur along the navigation path with other subscribers. Accordingly, one of the determined navigation paths is selected based on the estimated delivery time, safety check-ins with other subscribers in the safety area, etc., as in 410. However, if it is determined that a safety area between the source location and destination location does not exist and/or that there are no subscribers between the source location and the destination location, a navigation path is selected based on the estimated delivery time, as in 412. For example, the shortest and/or fastest route may be selected if it is determined that no safety area exists between the source location and the destination location.

Upon selection of a navigation path, navigation instructions that specify the navigation path to be followed by the autonomous vehicle are sent to an autonomous vehicle, as in 414. In some examples, the navigation instructions may include a source location, a destination location, an indication of the subscribers for which a safety check-in is to be performed, a current position of subscribers for which a safety check-in is to be performed, and/or a detectable identifier (e.g., unique identification) of subscribers for which a safety check-in is to be performed. Likewise, the navigation instructions may specify waypoints or other indications of the navigation path determined by the example process 400 that is to be followed by the autonomous vehicle. Likewise, the navigation instructions may specify a path that the autonomous vehicle is to navigate to move from its current position to the source location.

Figure 5:
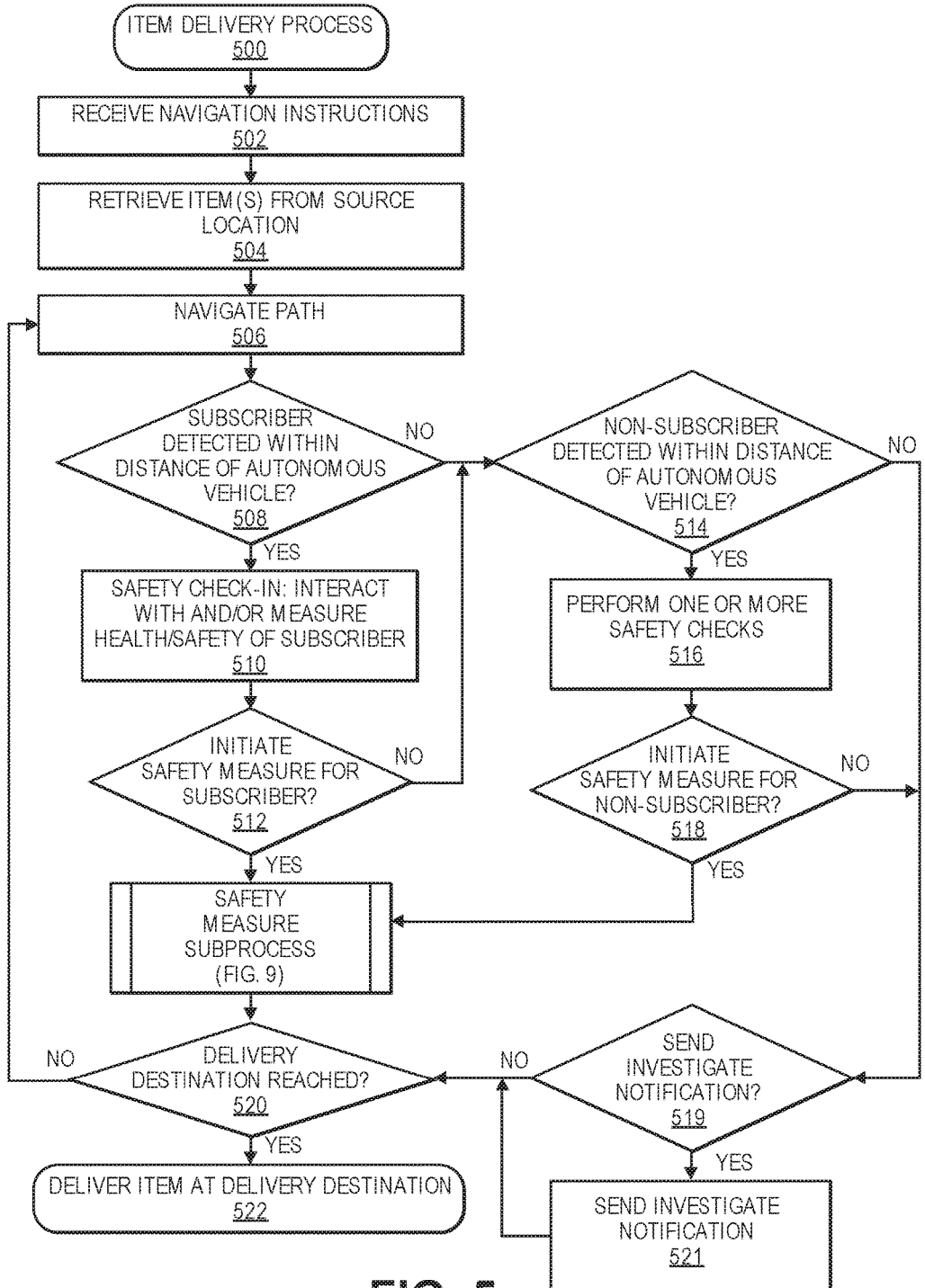
FIG. 5 is a flow diagram of an example item delivery process 500, in accordance with implementations of the present disclosure.

FIG. 5 is a flow diagram of an example item delivery process 500, in accordance with implementations of the present disclosure. The example process 500 begins when an autonomous vehicle receives navigation instructions, as in 502. Upon receipt of the navigation instructions, the autonomous vehicle navigates to the source location, if not already there, and retrieves the item, or items, that are to be delivered to the destination location, as in 504. Any variety of techniques may be utilized to load the ordered item into or onto the autonomous vehicle. As discussed above, in some implementations, the autonomous vehicle may be configured to autonomously pick the item from inventory and place the item into a compartment of the autonomous vehicle. In other examples, an agent (e.g., human or other robotic unit) may be configured to place the ordered item into or onto the autonomous vehicle.

Upon retrieval of the ordered item, the autonomous vehicle begins navigation along the navigation path as specified by the received navigation instructions, as in 506. As the autonomous vehicle navigates along the navigation path, a determination is made as to whether a subscriber is detected within a distance of the autonomous vehicle, as in 508. A detected subscriber may be a subscriber indicated in the navigation instructions that is to receive a safety check-in by the autonomous vehicle as the autonomous vehicle navigates the navigation path and/or any other subscriber detected by the autonomous vehicle to be within a defined distance of the navigation path.

If a subscriber is detected within a defined distance of the navigation path, a safety check-in may be performed for that subscriber, as in 510. In some instances, based on the detected position of the subscriber, the autonomous vehicle may temporarily navigate off the planned navigation path to reach the detected subscriber and perform a safety check-in. For example, if the detected subscriber is ten-feet off the planned navigation path, the autonomous vehicle may temporary navigate off the planned navigation path to be within a distance necessary to successfully accomplish the safety check-in. Depending on what is to be performed by the autonomous vehicle as part of the safety check-in, the distance, referred to herein as a check-in distance, between the subscriber and the autonomous vehicle may vary. For example, if the check-in only includes an audible output from the autonomous vehicle and an audible or visual response from the subscriber, the check-in distance may be large (e.g., approximately fifteen feet). In comparison, if the check-in includes measuring a body temperature, heartrate and/or pupil dilation, the check-in distance may be much less (e.g., approximately three feet).

A safety check-in may include, for example, one or more of the autonomous vehicle visually and/or audibly interacting with the subscriber, using one or more sensors to measure one or more characteristics of the subscriber, including but not limited to, body temperature, heartrate, pupil dilation, and/or other vital signs, posture of the subscriber, position of the subscriber, gestures performed by the subscriber (e.g., waving, thumbs up, thumbs down), gait of the subscriber, macro-expressions, micro-expressions, speech of the subscriber, etc. In general, any non-invasive and/or non-intrusive measurement may be performed by the autonomous vehicle when the autonomous vehicle is within a check-in distance of the subscriber. In some implementations, the tasks to be performed by the autonomous vehicle may be specified by the subscriber as a subscriber preference.

In other implementations, or in addition thereto, the task(s) performed by the autonomous vehicle as part of a safety check-in may vary based on the subscriber response or measurements received from other tasks. For example, if the autonomous vehicle generates an audible output to the subscriber and the subscriber does not respond and/or is determined to be laying down/non-responsive, the autonomous vehicle may perform other tasks, such as measuring heartrate, body temperature, etc. Likewise, the subscriber may have previously provided health related information that the autonomous vehicle may utilize to triage or diagnose potential safety concerns. For example, if the subscriber has indicated that they are diabetic, such information may be useful to the autonomous vehicle in determining expected responses and/or measurements from a safety check-in with the subscriber.

Figure 9:
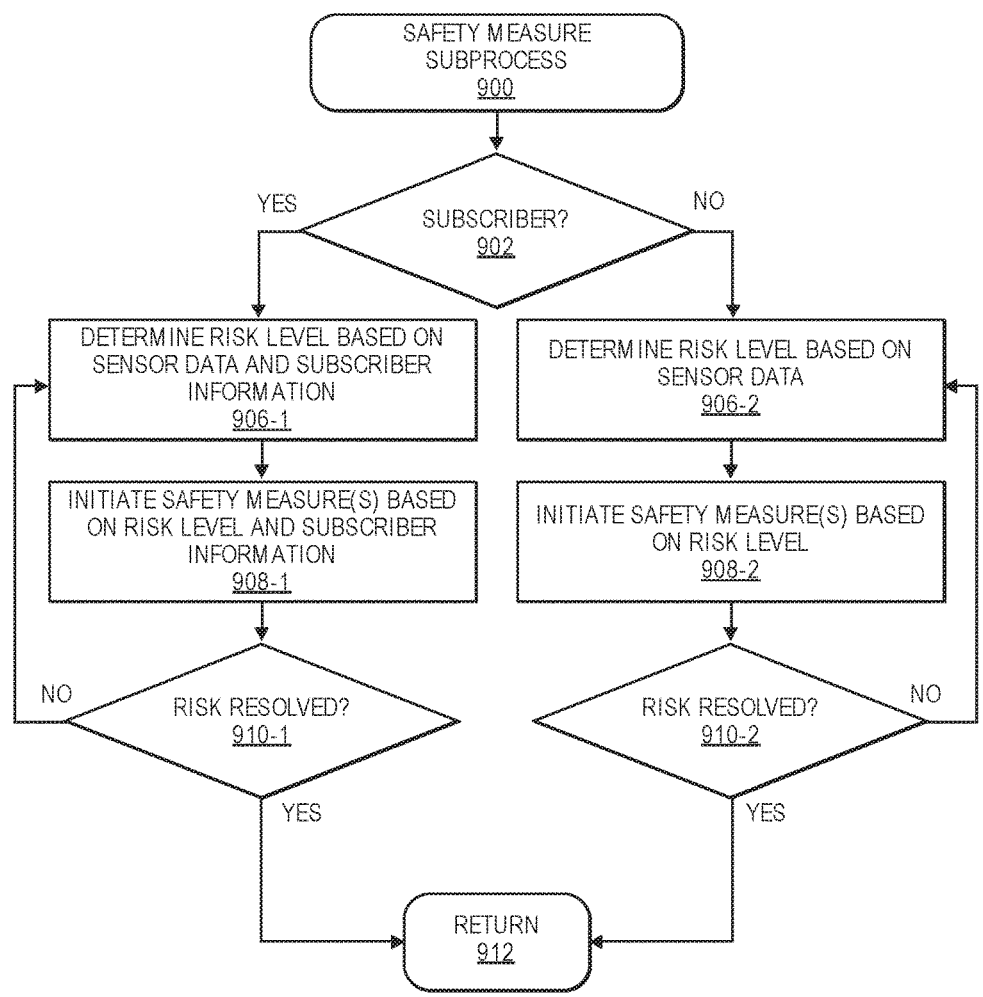
FIG. 9 is a flow diagram of an example safety measure subprocess 900, in accordance with implementations of the present disclosure.

Based on the response/measurements determined from the safety check-in, a determination is made as to whether one or more safety measures are to be initiated with respect to the subscriber, as in 512. If it is determined that a safety measure is to be performed, the safety measure subprocess, discussed below with respect to FIG. 9, is performed. However, if it is determined that one or more safety measures are not to be performed with respect to the subscriber or if it is determined at decision block 508 that a subscriber is not detected within a defined distance of the autonomous vehicle, a determination is made as to whether a non-subscriber is detected within a defined distance of the autonomous vehicle, as in 514.

If it is determined that a non-subscriber is detected within a defined distance of the autonomous vehicle, one or more default or predefined safety checks may be performed with respect to the non-subscriber. Because the detected non-subscriber is not a subscriber, information about the non-subscriber may not be available to the autonomous vehicle and no preference for safety check tasks may exist. As such, less intrusive and/or non-disruptive safety checks may be performed, referred to herein as default safety checks. For example, the autonomous vehicle may only determine the posture, gait, macro-expressions, micro-expressions, etc., of the non-subscriber but otherwise not interact with or disrupt the non-subscriber. As another example, if the autonomous vehicle is within a sufficient distance of the non-subscriber, the autonomous vehicle may measure one or vitals of the non-subscriber (e.g., body temperature, heartbeat, etc.) through non-contact measurements.

Based on the response/measurements determined from the safety check(s) of the non-subscriber, a determination is made as to whether one or more safety measures are to be initiated with respect to the non-subscriber, as in 516. If it is determined that a safety measure is to be performed, the safety measure subprocess, discussed below with respect to FIG. 9, is performed. However, if it is determined that there are no non-subscribers within a defined distance of the autonomous vehicle (decision block 514 or if it is determined that a safety measure is not to be performed with respect to the non-subscriber (decision block 518), a determination is made as to whether an investigate notification is to be sent, as in 519. An investigate notification may be a notification sent indicating that processed sensor data that did not result in a safety measure being performed may nonetheless justify further investigation by another autonomous vehicle. For example, if the processed sensor data indicates the presence of an object that was not previously detected in the area, or an object that is unknown to the monitoring system, while not justifying a safety measure, may result in an investigate notification being sent. The investigate notification may be sent by the autonomous vehicle and/or by the monitoring system as part of the processing of the sensor data. If it is determined that the investigate notification is to be sent, one or more of the autonomous vehicle and/or the monitoring system sends the investigate notification, as in 521. The investigate notification may be sent to a specific autonomous vehicle with instructions that the receiving autonomous vehicle investigate an area, a specific location, an object, etc. As another example, the investigate notification may be sent to numerous autonomous vehicles and the receiving autonomous vehicles may determine which one or more of the autonomous vehicles will further investigate.

The investigate notification may be sent to any one or more other autonomous vehicles along with sensor data and/or processed sensor data that resulted in the transmission of the safety notification. For example, the safety notification may include an image of the detected object, position information of the object, etc. Another autonomous vehicle, upon receiving an investigate notification may navigate to the area of the detected object or incident and further investigate the area to determine if a safety measure is to be performed, to determine the object, etc.

Upon transmission of an investigate notification, if it is determined that an investigate notification is not to be sent, or upon completion of the safety measure subprocess 900, a determination is made as to whether the autonomous vehicle has reached the delivery location and completed navigation of the navigation path, as in 520. If it is determined that the delivery location has not been reached, the example process 500 returns to block 506 and continues. If it is determined that the delivery location has been reached, the autonomous vehicle completes delivery of the item at the delivery location, as in 522.

Figure 6:
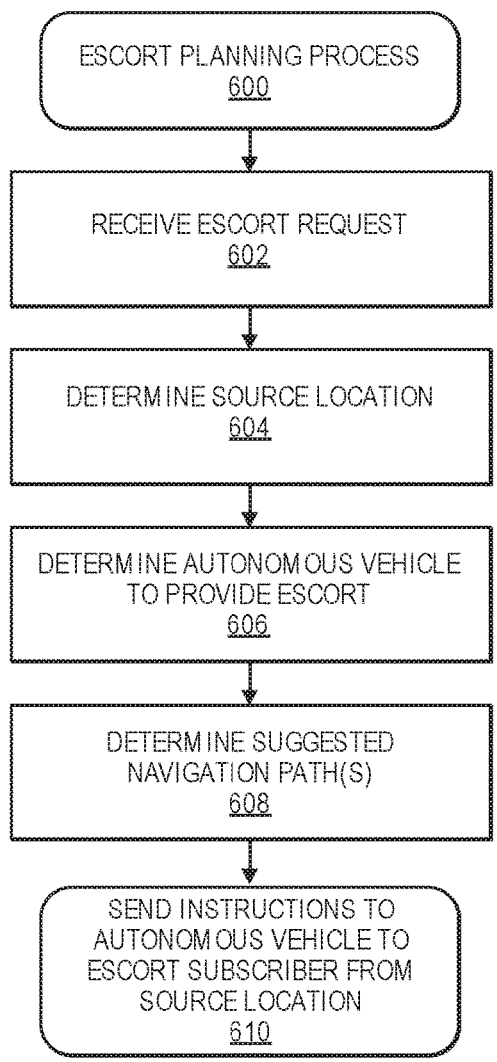
FIG. 6 is a flow diagram of an example escort planning process 600, in accordance with implementations of the present disclosure.

FIG. 6 is a flow diagram of an example escort planning process 600, in accordance with implementations of the present disclosure. The example process 600 begins upon receipt of an escort request, as in 602. As discussed above, an escort is an accompaniment of a subscriber or other human by an autonomous vehicle for protection, guidance, or to assist the person (e.g., carry items for the subscriber). Generally, an escort by an autonomous vehicle is between a source location (e.g., location of the subscriber) and a destination location specified or selected by the subscriber.

A subscriber may submit an escort request using, for example, a software application operating on a device (e.g., cellphone). The escort request may include, among other information, a location of the subscriber and/or a location at which the escort is to initiate (referred to herein as a source location) and/or a requested time at which the autonomous vehicle is to meet the subscriber at the source location. In other examples, the escort request may also include a mode of travel of the subscriber (e.g., walk, bike, rollerblade, skateboard), whether and what items the escort is to carry, a destination location, etc.

Based on the information included in the escort request, the source location is determined, as in 604. Likewise, an autonomous vehicle that is available and capable to operate as the escort is determined, as in 606. An autonomous vehicle may be considered available if it is within a distance of the source location such that it can navigate to the source location in time to meet the subscriber at a requested time and the autonomous vehicle is not or will not be performing another task that will prohibit the autonomous vehicle from operating as the escort. An autonomous vehicle may be determined to be capable of operating as the escort based on the additional information provided in the escort request and the operating parameters of the autonomous vehicle. For example, if the escort request indicates that the autonomous vehicle is to carry one or more items of a specified dimension and/or weight, the autonomous vehicle may be determined capable if it has available storage space to carry the specified items. As another example, the maximum speed of the autonomous vehicle and the mode of travel of the subscriber may be considered in determining if the autonomous vehicle is capable of operating as the escort.

In some examples, a capable and available escort may not be available to arrive at the source location at a time requested by the subscriber. In such an example, alternative times may be provided to the subscriber for selection.

Upon determining an autonomous vehicle that is available and capable of operating as the escort, one or more potential navigation paths between the source location and a destination location, if the destination location is specified, are determined, as in 608. If a destination location is not specified, this step may be omitted as part of the example process 600. Finally, instructions are sent to the selected autonomous vehicle to operate as an escort to escort the subscriber from the source location, as in 610. The instructions may include, among other data, an indication of the source location, an indication of the subscriber, an indication of the destination location, an indication of suggested navigation paths between the source location and the destination location, navigation instructions from the current location of the autonomous vehicle to the source location, etc.

Figure 7:
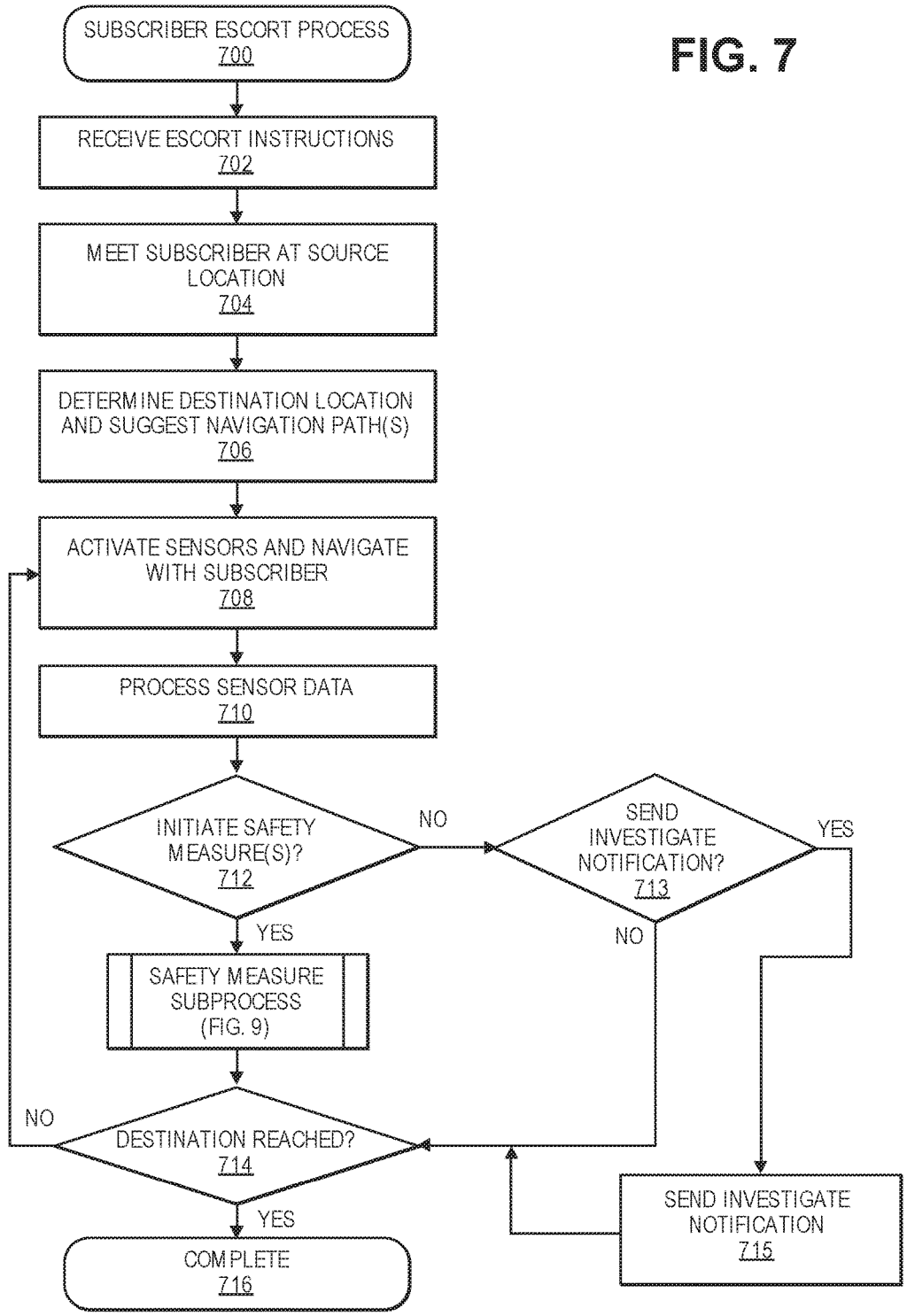
FIG. 7 is a flow diagram of an example subscriber escort process 700, in accordance with implementations of the present disclosure.

FIG. 7 is a flow diagram of an example subscriber escort process 700, in accordance with implementations of the present disclosure. The example process 700 may be performed by an autonomous vehicle alone or in combination with the monitoring system discussed above.

The example process begins upon receipt of escort instructions, as in 702. Upon receipt of the escort instructions, the autonomous vehicle navigates to and meets the subscriber at the specified source location, as in 704. A subscriber may be identified by, for example, a beacon or signal emitted from a device (e.g., smartphone) in the possession of the subscriber. In other examples, the autonomous vehicle may obtain images of potential subscribers at the source location and process the images using one or more facial and/or feature recognition algorithms to detect the subscriber. In still other examples, the subscriber may have a unique code or other identifier that the subscriber provides to the autonomous vehicle to identify themselves as the subscriber.

Upon meeting the subscriber at the source location, a destination location, if not known, may be determined and one or more navigation paths between the source location and the destination location determined and suggested to the subscriber, as in 706. For example, the safest route between the source location and the destination location may be determined, for example, based on one or more of, lighting conditions along potential routes, quantity of other persons along potential routes, history of other incidents along potential routes, etc. In other implementations, potential routes may not be determined and/or the destination location may not be known. In such examples, the autonomous vehicle may operate in a follow-me mode in which the autonomous vehicle follows the subscriber receiving the escort. For example, a device of the subscriber may emit a signal that is detected and followed by the autonomous vehicle. Alternatively, or in addition thereto, the autonomous vehicle may obtain video that is processed to detect and follow the subscriber.

As the autonomous vehicle provides escort for the subscriber, one or more sensors are activated to obtain information relating to the area surrounding the subscriber, as in 708. As discussed above, any variety of sensors may be utilized to deter potentially malicious activity and provide safe escort for the subscriber. For example, one or more digital video cameras, thermal imaging cameras, etc., may be activated to record video of the area surrounding the subscriber. The video data may be recorded by the autonomous vehicle, wirelessly transmitted to the monitoring system, and/or wirelessly transmitted to another location (e.g., human manned security station). Alternatively, or in addition thereto, a microphone and/or speaker may be activated to record and/or output sounds in the area surrounding the subscriber.

As sensor data is collected, the sensor data is processed, in as 710. For example, image data may be processed using one or more object detection algorithms to determine if another object (e.g., human or other animal) is approaching the subscriber. Such processing may be done by the autonomous vehicle and/or by the monitoring system in communication with the autonomous vehicle. As another example, audio data received from the microphone(s) may be processed to determine if any unexpected sounds and/or wake sounds are detected in the area of the subscriber. For example, audio data may be processed and compared to wake sounds or sounds including, but not limited to, screams, calls for help, crying, etc.

Based on the processed sensor data, a determination is made as to whether one or more safety measures are to be performed, as in 712. If it is determined that a safety measure is not to be performed, a determination is made as to whether an investigate notification is to be sent, as in 713. An investigate notification may be a notification sent indicating that processed sensor data that did not result in a safety measure being performed may nonetheless justify further investigation by another autonomous vehicle. For example, if the processed sensor data indicates the presence of an object that was not previously detected in the area, or an object that is unknown to the monitoring system, while not justifying a safety measure, may result in an investigate notification being sent. The investigate notification may be sent by the autonomous vehicle and/or by the monitoring system as part of the processing of the sensor data. If it is determined that the investigate notification is to be sent, one or more of the autonomous vehicle and/or the monitoring system sends the investigate notification, as in 715. The investigate notification may be sent to a specific autonomous vehicle with instructions that the receiving autonomous vehicle investigate an area, a specific location, an object, etc. As another example, the investigate notification may be sent to numerous autonomous vehicles and the receiving autonomous vehicles may determine which one or more of the autonomous vehicles will further investigate.

The investigate notification may be sent to any one or more other autonomous vehicles along with sensor data and/or processed sensor data that resulted in the transmission of the safety notification. For example, the safety notification may include an image of the detected object, position information of the object, etc. Another autonomous vehicle, upon receiving an investigate notification, may navigate to the area of the detected object or incident and further investigate the area to determine if a safety measure is to be performed, to determine the object, etc.

Returning to decision block 712, if it is determined that one or more safety measures are to be performed, the example safety measure subprocess 900, discussed further below with respect to FIG. 9, is initiated. Upon completion of the safety measure subprocess 900, upon transmission of an investigate notification, or if it is determined that an investigate notification is not to be sent, a determination is made as to whether the destination location has been reached, as in 714. In some implementations, it may be determined that the destination location has been reached when the subscriber indicates to the autonomous vehicle that escort is no longer needed and/or desired. Alternatively, it may be determined that the destination location has been reached, when the autonomous vehicle and the subscriber reach a specified destination location.

If it is determined that the destination location has not been reached, the example process 700 returns to block 708, the sensors continue to collect data regarding the area surrounding the subscriber, and the example process 700 continues. If it is determined that the destination location has been reached by the subscriber and the autonomous vehicle, the example process completes, as in 716.

Figure 8:
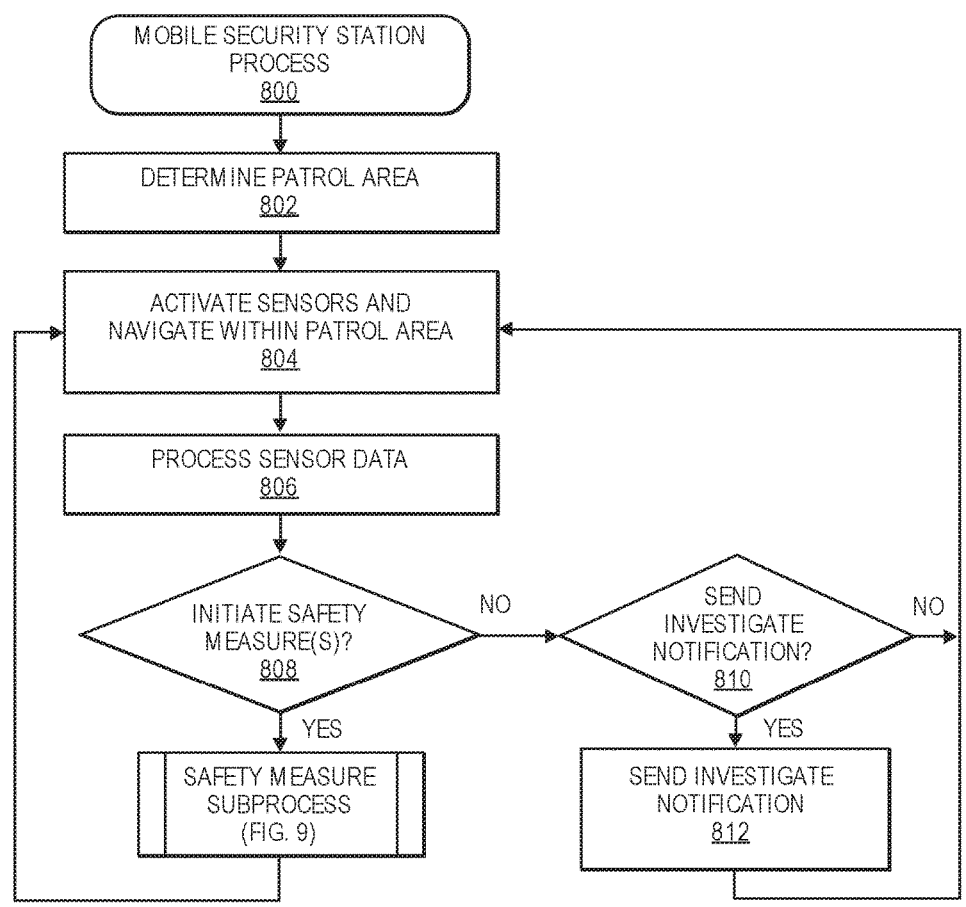
FIG. 8 is a flow diagram of an example mobile security station process 800, in accordance with implementations of the present disclosure.

FIG. 8 is a flow diagram of an example mobile security station process 800, in accordance with implementations of the present disclosure. The example process 800 begins by determining a patrol area for an autonomous vehicle, as in 802. The patrol area may be a defined geographic region, an area along a navigation path being navigated by the autonomous vehicle, or any other area. In some examples, multiple patrol areas may overlap and/or include more than one autonomous vehicle.

The autonomous vehicle, while navigating within a patrol area may activate one or more sensors to obtain information (e.g., audio, video) regarding the area surrounding the autonomous vehicle, as in 804. As data is received from the sensors, the sensor data is processed, as in 806. Processing of the sensor data may include, for example, processing video data using one or more object detection algorithms, facial recognition algorithms, edge detection algorithms, etc., to determine a presence of a human or other animal and/or other activities within the area (e.g., fire, water hazards, etc.). Likewise, audio data may be processed to detect noises within the area. For example, audio data may be processed and compared to wake sounds or sounds including, but not limited to, screams, calls for help, crying, etc. In some instances, during a normal state, sensor data may only be processed to determine if one or more wake sounds are detected and/or if one or more know objects (e.g., fire, criminal suspect) are detected. If nothing is detected, the collected sensor data is discarded.

In still other examples, processing of the sensor data may include determining whether a physical input has been provided to an input of the autonomous vehicle. For example, a person may touch a touch-based display of the autonomous vehicle.

As sensor data is processed, a determination is made as to whether one or more safety measures are to be performed, as in 808. For example, if a wake sound is detected, image(s) of known objects are detected, and/or a physical input is received by the autonomous vehicle, it may be determined that one or more safety measures are to be performed. If it is determined that a safety measure is not to be performed, it is determined whether an investigate notification is to be sent, as in 810. An investigate notification may be a notification sent indicating that processed sensor data that did not result in a safety measure being performed may nonetheless justify further investigation by another autonomous vehicle. For example, if the processed sensor data indicates the presence of an object that was not previously detected in the area, or an object that is unknown to the monitoring system, while not justifying a safety measure, may result in an investigate notification being sent. The investigate notification may be sent by the autonomous vehicle and/or by the monitoring system as part of the processing of the sensor data. If it is determined that the investigate notification is to be sent, one or more of the autonomous vehicle and/or the monitoring system sends the investigate notification, as in 812. The investigate notification may be sent to a specific autonomous vehicle with instructions that the receiving autonomous vehicle investigate an area, a specific location, an object, etc. As another example, the investigate notification may be sent to numerous autonomous vehicles and the receiving autonomous vehicles may determine which one or more of the autonomous vehicles will further investigate.

The investigate notification may be sent to any one or more other autonomous vehicles along with sensor data and/or processed sensor data that resulted in the transmission of the safety notification. For example, the safety notification may include an image of the detected object, position information of the object, etc. Another autonomous vehicle, upon receiving an investigate notification may navigate to the area of the detected object or incident and further investigate the area to determine if a safety measure is to be performed, to determine the object, etc.

After sending an investigate notification or if it is determined that an investigate notification is not to be sent, the example process returns to block 804 and continues. If it is determined that one or more safety measures are to be performed, the safety measure subprocess 900, discussed further below with respect to FIG. 9, is performed. Upon completion of the safety measure subprocess 900, the example process 800 returns to block 804 and continues.

FIG. 9 is a flow diagram of an example safety measure subprocess 900, in accordance with implementations of the present disclosure. The example safety measure subprocess may be initiated by any one of the example process 500, 700, or 800, discussed above with respect to FIGS. 5, 7, and 8. Upon initiation of the example safety measure subprocess 900, a determination is made as to whether the safety measure is being performed for a subscriber, as in 902. Determining if the safety measure is to be performed with respect to a subscriber may be determined based on the source of the initiated safety measure and/or the provided data. For example, if the safety measure subprocess 900 is initiated by the example process 500 in response to a determination that a safety measure is to be initiated for a subscriber (decision block 512, FIG. 5), information received from the example process 500 may identify the subscriber or include an indication that the safety measure is for a subscriber. Similarly, if the safety measure subprocess is initiated by the example process 700 as part of a subscriber escort, the information received from the example process 700 may indicate and/or identify the subscriber. Alternatively, if the safety measure subprocess 900 is initiated by the example process 500 in response to a determination that a safety measure is to be initiated for a non-subscriber (decision block 518, FIG. 5), information received from the example process may indicate that the person is a non-subscriber (i.e., unknown). As still another example, if the example safety measure subprocess 900 is initiated by the example process 800, additional processing may be performed to determine if the person that resulted in the example safety measure subprocess 900 being performed is a subscriber. For example, one or more images may be processed using facial recognition in an effort to determine if the person is a subscriber or otherwise known.

If it is determined that the person is a subscriber, a risk level is determined based on received sensor data and information known about the subscriber, as in 906-1. If it is determined that the person is a non-subscriber and/or information about the person is not known, a risk level is determined based on sensor data, as in 906-2. In some implementations, a single risk level may exist. In other implementations, multiple risk levels and risk levels of different types may exist. For example, if the sensor data indicates a potential health risk (e.g., the person is non-responsive, laying down, has low body temperature, experiencing signs of a seizure, etc.), the risk level may correspond to a life-threatening health risk. As another example, if the sensor data indicates a potential safety risk (e.g., possible attack against the person, screaming, crying, other malicious activity), the risk level may correspond to a security risk.

If the person is a subscriber, subscriber preferred safety measures may be performed for different risk levels, alone or in combination with other safety measures, as in 908-1. If the person is a non-subscriber, or otherwise not known, one or more default safety measures may be performed, as in 908-2. A safety measure may be any action that is directed toward resolving the detected risk. For example, if the risk level is determined to be a life-threatening health risk, the performed safety measures may include contacting emergency personnel and providing location information for the person, information about the person if known (e.g., health information known about a subscriber), measured sensor data, etc. Likewise, an audible output, such as a siren on the autonomous vehicle may be activated to draw attention to the person and potentially receive assistance from other persons in the area.

As another example, if the risk is a security risk, additional sensors on the autonomous vehicle may be activated to obtain additional information about the area, an audible output, such as a siren may be activated to deter any potential malicious activity, one or more warning messages may be generated, emergency personnel may be contacted and provided the recorded sensor information and provided position information relating to the autonomous vehicle and the subscriber, an aerial vehicle may be deployed from the autonomous vehicle to obtain video data of the area surrounding the subscriber, etc.

In some instances, different risk levels may result in different safety measures being performed and the risk levels may increase or decrease depending on the response to the safety measures. For example, if the autonomous vehicle is escorting a subscriber between a source location and a destination location and processing of image data detects another person approaching the subscriber, an initial security risk level may be set that obtains video data of the approaching person, processes the video data in an effort to identify the person and determine if the person is potentially known to the subscriber, outputs an audible warning to the subscriber indicating that a person is approaching, and/or outputs an audible warning to the person approaching informing that person that video data is being obtained.

Upon initiation of one or more safety measures, a determination is made as to whether the risk has been resolved, as in 910-1 and 910-2. Resolution of a risk may include arrival of emergency personnel, responsiveness of a subscriber or non-subscriber, potential malicious activity stopping, etc. If it is determined that the risk has been resolved, the example subprocess 900 completes and returns to the process that initiated the subprocess an indication that the subprocess 900 has completed and the risk has been resolved, as in 912.

If it is determined that the risk has not been resolved, the example subprocess 900 returns to either bock 906-1 (for subscribers) or block 906-2 (for non-subscribers), and continues. Continuing with the above example of a person approaching a subscriber that is being escorted, if the initial safety measures do not resolve the potential risk, the risk level may be increased and additional safety measures may be initiated. For example, if the person continues to approach the subscriber, the subscriber indicates that the person is unknown or presents other warning signs (e.g., runs, screams, tells the autonomous vehicle that the person is unknown or not friendly, etc.), the risk level may be increased. At an increased security risk level, the autonomous vehicle may output another audible warning to the approaching person, activate one or more lights, output sound from a speaker or siren, and/or send wireless data to emergency personnel alerting them to the potential risk and providing images of the approaching person, information about the subscriber, and position information. In some implementations, the autonomous vehicle may have other defense mechanisms that may be utilized to physically protect the subscriber from potential threats.

The example subprocess 900 continues until the risk is determined to be resolved, regardless of whether the person is a subscriber or non-subscriber. The benefit of being a subscriber is that additional information regarding the subscriber's health, preferences for safety measures to be performed, etc., may be provided and known to the example subprocess 900 in advance. For example, subscribers may provide health related information that can be transmitted to emergency personnel that are called to provide assistance. In another example, subscribers may provide information and/or images of other persons that are known to the subscriber (friend or enemy) such that those persons can be detected by the autonomous vehicles and used as additional information in determining whether a safety measure is to be performed and/or in determining a risk level. As still another example, subscribers may provide advance information as to what safety measures are to be performed alone or in combination with other safety measures. For example, a subscriber may identify emergency contact persons that are contacted in high risk safety measures in addition to contact emergency personnel. In comparison, non-subscribers do not have the opportunity to provide information in advance. As such, the safety measures performed and/or the information provided may be limited to that which can be determined by the autonomous vehicle.

Subscriber information, such preferences, health history, etc., may be stored in one or more data stores and accessible to the autonomous vehicles and/or the monitoring system discussed herein. As such, additional information and proactive safety measures may be taken with respect to subscribers based on the information provided by those subscribers and/or learned about those subscribers over a period of time.

The systems and methods of the present disclosure are directed to utilizing autonomous vehicles to deliver items, escort subscribers between locations, provide mobile security stations, and/or to provide a general level of increased safety to the area around the autonomous vehicles. The information or data that may be captured and reported by one or more autonomous vehicles, or obtained from any intrinsic, extrinsic sources and/or emergency personnel, and utilized to generate or modify navigation paths in accordance with the present disclosure is not limited. For example, such information or data may be qualitative in nature, e.g., paths, speeds, lighting levels, positions, times or dates, battery life, fuel levels or carrying capacities expressed in numeric terms. The information or data may also be qualitative in nature, e.g., courses, speeds, positions, times or dates of arrival or departure, battery life, fuel levels or carrying capacities expressed in words such as "northeast," "south," "slow," "fast," "high," "valley," "waypoint," "tilt," "Sunday," "low light," "poor lighting," "good lighting," "safe," "dangerous," "full charge," "half tank," etc.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow charts shown in FIGS. 5-9, orders in which such methods or processes are presented are not intended to be construed as any limitation on the claims, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A computer-implemented method comprising:
   receiving an order for a purchase of an item from a customer, wherein the order specifies a destination location for a delivery of the item;
   identifying, by at least one server, a source location where the item is located;
   planning a first navigation path between the source location and the destination location that may be navigated by an autonomous vehicle to transport the item from the source location to the destination location;
   determining a location of at least one person between the source location and the destination location;
   planning a second navigation path between the source location and the destination location that may be navigated by the autonomous vehicle such that the autonomous vehicle will navigate within a defined distance of the location of the at least one person as the autonomous vehicle navigates between the source location and the destination location to transport the item from the source location to the destination location;
   determining a first estimated delivery time with respect to the first navigation path;
   determining a second estimated delivery time with respect to the second navigation path, wherein the second estimated delivery time is greater than the first estimated delivery time;
   selecting, by the at least one server and based at least in part on the second navigation path causing the autonomous vehicle to navigate within the defined distance of the location, the first estimated delivery time and the second estimated delivery time, the second navigation path; and
   sending an instruction to the autonomous vehicle to navigate the second navigation path and to perform a safety check-in with respect to the at least one person, wherein the safety check-in includes determining a health or safety of the at least one person.

2. The computer-implemented method of claim 1, wherein the at least one person is a subscriber that has requested to receive safety check-ins by one or more autonomous vehicles.

3. The computer-implemented method of claim 1, wherein the safety check-in includes at least one of:
   the autonomous vehicle interacting with the at least one person, or
   the autonomous vehicle measuring at least one characteristic of the at least one person.

4. The computer-implemented method of claim 3, wherein the at least one characteristic is at least one of a body temperature of the at least one person, a heartrate of the at least one person, a pupil dilation of the at least one person, a posture of the at least one person, a position of the at least one person, a gesture performed by the at least one person, a gait of the at least one person, a macro-expression presented by the at least one person, a micro-expression presented by the at least one person, or a speech of the at least one person.

5. The computer-implemented method of claim 1, further comprising:
determining a safety area in which at least one or more autonomous vehicles are to be located to provide safety to one or more persons; and
wherein planning the second navigation path includes planning the second navigation path such that the autonomous vehicle will navigate through at least a portion of the safety area.

6. The computer-implemented method of claim 5, wherein the safety area encompasses one or more of the source location, the destination location, or the subscriber.

7. The computer-implemented method of claim 1, further comprising:
determining a time since a last safety check-in for the person; and
wherein selecting is further based at least in part on the time since the last safety check-in.

8. A method comprising:
receiving a request for a delivery of an item to a destination location;
identifying, by at least one server, a source location where the item is located;
receiving, from a device associated with a subscriber, position information indicating a location of the subscriber, wherein the subscriber is a person that has requested to receive safety check-ins by one or more autonomous vehicles navigating within a defined distance of a location of the subscriber;
planning a navigation path between the source location and the destination location that may be navigated by an autonomous vehicle such that the autonomous vehicle will navigate within the defined distance of the location of the subscriber as the autonomous vehicle navigates between the source location and the destination location to transport the item from the source location to the destination location; and
sending an instruction to the autonomous vehicle to navigate the navigation path and to perform a safety check-in with respect to the subscriber as the autonomous vehicle navigates within the defined distance of the subscriber, wherein the safety check-in includes determining a health or a safety of the subscriber.

9. The method of claim 8, further comprising:
receiving from a sensor of the autonomous vehicle and as the autonomous vehicle is navigating the navigation path, sensor data;
processing the sensor data to determine if a safety measure is to be activated by the autonomous vehicle; and
in response to determining that a safety measure is to be activated, causing at least one safety measure to be initiated.

10. The method of claim 9, further comprising:
in response to determining that a safety measure is not to be activated, determining from the processed sensor data that an investigation notification is to be sent to a second autonomous vehicle.

11. The method of claim 10, wherein the investigation notification provides an indication of an area to be further investigated by the second autonomous vehicle to determine if a safety measure is to be activated.

12. The method of claim 8, further comprising:
determining a respective location for each of a plurality of people located between the source location and the destination location; and
wherein the navigation path causes the autonomous vehicle to navigate within at least a defined distance of each person of the plurality of people.

13. The method of claim 8, further comprising:
detecting a non-subscriber within a distance of the navigation path;
collecting sensor data corresponding to the non-subscriber;
processing the sensor data to determine if a safety measure is to be performed; and
initiating a default safety measure in response to a determination that a safety measure is to be performed.

14. The method of claim 8, further comprising:
receiving from a sensor of the autonomous vehicle, sensor data, wherein the sensor data is at least one of processed by the autonomous vehicle or wirelessly transmitted to a monitoring station for processing.

15. An autonomous vehicle, comprising:
a frame;
a motor;
a sensor;
a storage compartment;
a computing system configured to at least:
receive instructions to navigate a navigation path between a source location and a destination location to complete an item delivery corresponding to an item included in the storage compartment;
cause the autonomous vehicle to navigate the navigation path;
determine, based at least in part on position information received from a device associated with a subscriber, a location of the subscriber, wherein the subscriber is a person that has requested to receive safety check-ins by one or more autonomous vehicles navigating within a defined distance of the location of the subscriber;
cause the autonomous vehicle to navigate within the defined distance of the location of the subscriber as the autonomous vehicle navigates the navigation path between the source location and the destination location; and
cause the autonomous vehicle to perform a safety check-in with respect to the subscriber as the autonomous vehicle navigates within the defined distance of the subscriber, wherein the safety check-in includes collecting, using the sensor, sensor data corresponding to the person subscriber when the autonomous vehicle is within the defined distance.

16. The autonomous vehicle of claim 15, wherein the computing system further causes the autonomous vehicle to at least:
navigate away from the navigation path such that the autonomous vehicle can navigate to within the defined distance of the person location of the subscriber.

17. The autonomous vehicle of claim 15, wherein the computing system further causes the autonomous vehicle to at least:
perform a safety check-in with respect to the subscriber, and based at least in part on the sensor data, to determine whether a safety measure is to be performed with respect to a health or a safety of the subscriber.

18. The autonomous vehicle of claim 17, wherein the autonomous vehicle maintains or has access to information corresponding to the subscriber.

19. The autonomous vehicle of claim 15, wherein the safety check-in includes at least one safety measure specified by the subscriber to be performed in response to determining that the safety check-in is to be performed.

20. The autonomous vehicle of claim 15, wherein the computing system is further configured to at least:
   determine, based at least in part on the sensor data, a risk level; and
   initiate a first safety measure of a plurality of safety measures corresponding to the risk level.

21. The autonomous vehicle of claim 15, further comprising:
   an aerial vehicle that may be deployed from the autonomous vehicle to obtain images or other data from an aerial perspective.

* * * * *